(12) United States Patent
Qiao et al.

(10) Patent No.: US 11,861,371 B2
(45) Date of Patent: Jan. 2, 2024

(54) AUTOMATED TRANSFER OF PERIPHERAL DEVICE OPERATIONS

(71) Applicant: Citrix Systems, Inc., Fort Lauderdale, FL (US)

(72) Inventors: Zongpeng Qiao, Nanjing (CN); Swaminathan Manivannan, Bangalore (IN); Huijin Huang, Nanjing (CN); Ge Gao, Nanjing (CN)

(*) Notice: Subject to any disclaimer, the term of this patent is extended or adjusted under 35 U.S.C. 154(b) by 41 days.

(21) Appl. No.: 17/505,921

(22) Filed: Oct. 20, 2021

(65) Prior Publication Data

US 2023/0116178 A1 Apr. 13, 2023

Related U.S. Application Data

(63) Continuation of application No. PCT/CN2021/122204, filed on Sep. 30, 2021.

(51) Int. Cl.
*G06F 9/4401* (2018.01)
*G06F 13/10* (2006.01)
(Continued)

(52) U.S. Cl.
CPC ........ *G06F 9/4411* (2013.01); *G06F 11/3041* (2013.01); *G06F 11/3051* (2013.01);
(Continued)

(58) Field of Classification Search
CPC ............ G06F 11/3438; G06F 11/3466; G06F 11/3485; G06F 11/349; G06F 11/3041; G06F 11/3048; G06F 11/3055; G06F 11/3058; G06F 11/3062; G06F 11/3065; G06F 9/4411; G06F 9/4413;
(Continued)

(56) References Cited

U.S. PATENT DOCUMENTS 5,553,246 A * 9/1996 Suzuki ................ G06F 13/4217
710/316
6,460,093 B1 * 10/2002 Taugher .............. G06F 13/4072
711/111

(Continued)

FOREIGN PATENT DOCUMENTS

CN 113079491 A 7/2021
CN 113347560 A 9/2021

OTHER PUBLICATIONS

International Search Report and Written Opinion dated Jun. 28, 2022 for International Patent Application No. PCT/CN2021/122204.

*Primary Examiner* — Raymond N Phan

(57) ABSTRACT

Systems and techniques for automated transfer of peripheral device operations are described herein. In an example, a system may adapted so that, while a first device of a first type and a second device of the first type are simultaneously connected to a client device, the first device, rather than the second device, is used as an active device of the first type for at least one application, the first and second devices being peripheral devices. The system may be further adapted so that, while both the first and second devices remain connected to the client device, a switch from the first device to the second device by a user is determined, and, based on the switch from the first device to the second device, the second device, rather than the first device, is used as the active device of the first type for the at least one application.

18 Claims, 14 Drawing Sheets

(51) Int. Cl.
*G06F 11/34* (2006.01)
*G06F 11/30* (2006.01)

(52) U.S. Cl.
CPC ........ *G06F 11/349* (2013.01); *G06F 11/3438* (2013.01); *G06F 13/102* (2013.01)

(58) Field of Classification Search
CPC .... G06F 9/4415; G06F 9/4416; G06F 9/4418; G06F 9/442; G06F 9/445; G06F 9/44505; G06F 9/4451; G06F 9/44526; G06F 9/44536
See application file for complete search history.

(56) References Cited

U.S. PATENT DOCUMENTS

| | | | |
|---|---|---|---|
| 10,419,838 B1* | 9/2019 | Criswell | H04R 1/1041 |
| 11,434,164 B2* | 9/2022 | Goel | C03B 27/012 |
| 2008/0177904 A1* | 7/2008 | Storey | G06F 9/4411 710/10 |
| 2012/0053175 A1* | 3/2012 | Gelbard | A61P 9/10 514/249 |
| 2012/0244812 A1 | 9/2012 | Rosener | |
| 2013/0227179 A1* | 8/2013 | Kalayjian | H04M 1/72454 710/36 |
| 2015/0331699 A1 | 11/2015 | McKillop et al. | |
| 2017/0280223 A1* | 9/2017 | Cavarra | G06F 3/167 |
| 2019/0079880 A1* | 3/2019 | Unemyr | G06F 13/102 |

* cited by examiner

AUTOMATED TRANSFER OF PERIPHERAL DEVICE OPERATIONS

CROSS-REFERENCE TO RELATED APPLICATIONS

This application is a continuation of and claims the benefit under 35 U.S.C. § 120 and 35 U.S.C. § 365(c) to International Application PCT/CN2021/122204, entitled AUTOMATED TRANSFER OF PERIPHERAL DEVICE OPERATIONS, with an international filing date of Sep. 30, 2021, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, FL, including the Citrix Workspace™ family of products, provide such capabilities. These applications may utilize peripheral devices connected to the client devices.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves, while both a first device of a first type and a second device of the first type are simultaneously connected to a client device, using the first device, rather than the second device, as an active device of the first type for at least one application, the first device and the second device being peripheral devices; while both the first device and the second device remain connected to the client device, determining a switch from the first device to the second device by a user; and based at least in part on the switch from the first device to the second device, using the second device, rather than the first device, as the active device of the first type for the at least one application.

In some disclosed embodiments, a system includes at least one processor, and at least one computer-readable medium encoded with instructions which, when executed by the at least one processor, cause the system to: while both a first device of a first type and a second device of the first type are simultaneously connected to a client device, use the first device, rather than the second device, as an active device of the first type for at least one application, the first device and the second device being peripheral devices; while both the first device and the second device remain connected to the client device, determine a switch from the first device to the second device by a user; and based at least in part on the switch from the first device to the second device, use the second device, rather than the first device, as the active device of the first type for the at least one application.

In some disclosed embodiments, at least one non-transitory computer-readable medium encoded with instructions which, when executed by at least one processor of a system, cause the system to: while both a first device of a first type and a second device of the first type are simultaneously connected to a client device, use the first device, rather than the second device, as an active device of the first type for at least one application, the first device and the second device being peripheral devices; while both the first device and the second device remain connected to the client device, determine a switch from the first device to the second device by a user; and based at least in part on the switch from the first device to the second device, use the second device, rather than the first device, as the active device of the first type for the at least one application.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1A:
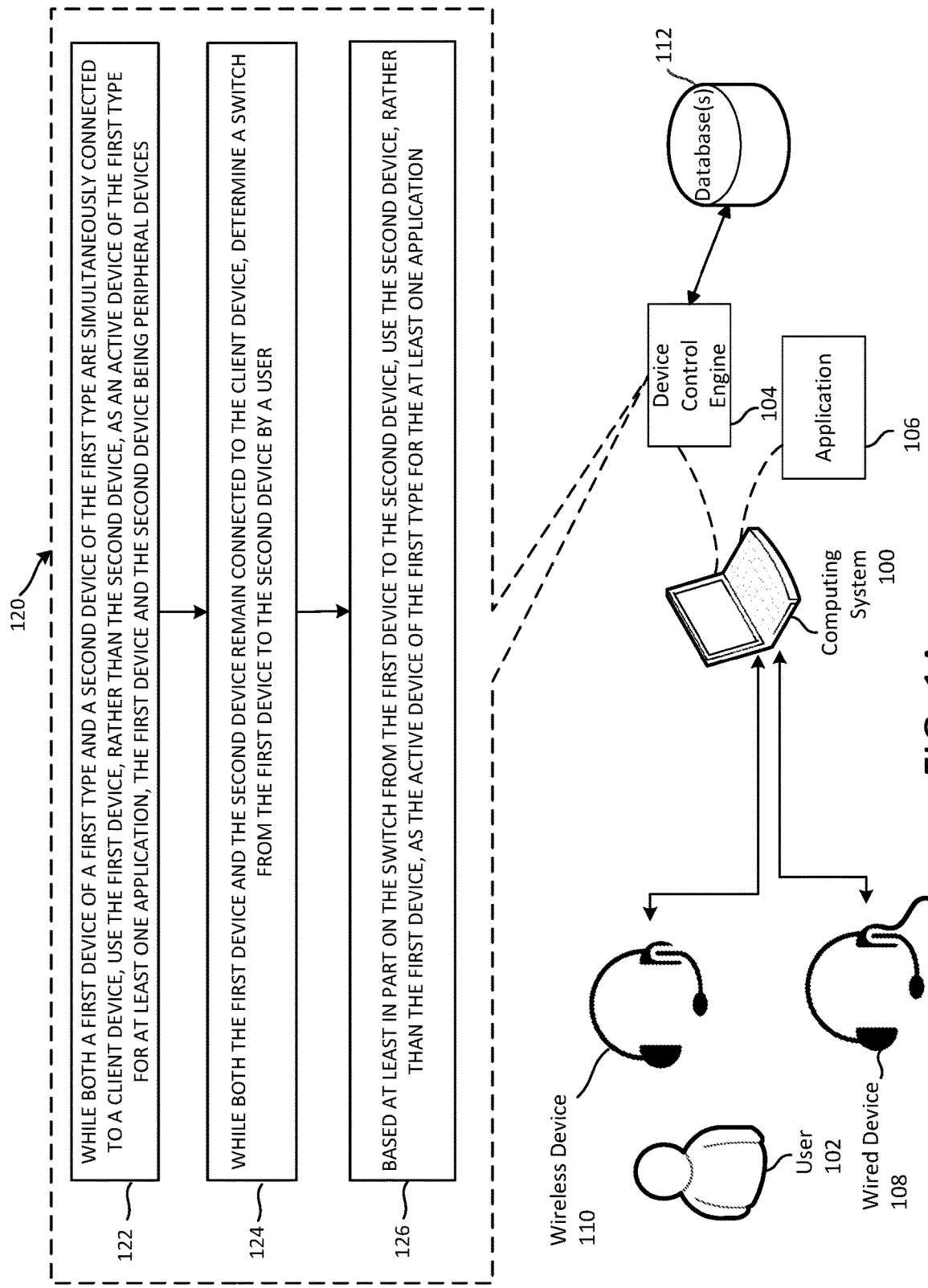
FIG. 1A is a high-level diagram illustrating an example system for automatic transfer of peripheral device operations, in accordance with some embodiments of the present disclosure.

For purposes of reading the description of the various embodiments below, the following descriptions of the sections of the specification and their respective contents may be helpful:

Section A provides an introduction to example embodiments of a system for automatically selecting a peripheral device from among a plurality of simultaneously connected peripheral devices;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes an example implementation of a resource delivery system which may be useful for practicing embodiments described herein;

Section F provides a more detailed description of example embodiments of the system introduced in Section A; and Section G describes example implementations of methods, systems/devices, and computer-readable media in accordance with the present disclosure.

A. Introduction to Illustrative Embodiments of a System for Automated Transfer of Peripheral Device Operations Applications on a computing system may utilize various devices for receiving input from a user and/or providing output to a user. These devices may be internal or external to the computing system, and may be connected through a wired or wireless connection. The computing system may have multiples of similar devices connected at one time. For example, a computing system may have both a wired headset and a wireless headset connected simultaneously.

A user may employ multiple peripheral devices for various reasons and preferences. For instance, several peripheral devices of the same type may be simultaneously connected to a computing system and a user may physically switch among such devices based on user preferences or needs. For example, a user may prefer a headset for gaming and prefer a speaker for listening to music. As another example, a user may prefer a wireless headset, but may switch to a wired headset should the battery run out or interference occur with the wireless headset.

A user may initialize an application, such as an audio/video conference, that utilizes a connected peripheral device, such as a headset. The user may configure a particular peripheral device as a default or preferred device for the computing system. While such a default or preferred device designation may be advantageous in some circumstances, the inventors have recognized and appreciated that the preferred device may not be the preferred device for a given application or scenario. For instance, it may be undesirable to use loudspeakers when in a public place. Thus, the user may need to manually direct the computing system to use a different peripheral device as the active device in such a scenario. This may require the user to not only physically switch devices, but also take one or more steps to designate the different device as the active device on their computer. The need to manually take such extra step(s) to designate the different device as the active device may result in a poor user experience. For example, using conventional techniques, if a user switches headsets during a video conference, the user would need to take the time to locate and manipulate the user interface feature for designating a new active device. Further, as a result of that extra effort and the added delay of having to select the different headset as the active device, the user may miss an important part of the conversation.

Offered are systems and techniques for determining situations in which a user switches from using one peripheral device connected to a computing system to another peripheral device that is connected (e.g., simultaneously connected) to the computing system (e.g., by taking off a wireless headset and putting on a wired headset), and automatically designating the newly-used peripheral device as the active device (e.g., one currently in use) based on that determination. As explained in more detail below, in some implementations, the computing system may employ a device control engine that is configured to determine when the user physically switches between peripheral devices, such as a swap from a first peripheral device to a second peripheral device, as well as to update the computing system for data input and/or output from the peripheral device the user is presently utilizing. In some implementations, the device control engine may utilize sensors to identify a change between peripheral devices and determine which device is to be designated as the active device. In some implementations, the device control engine may additionally or alternatively use stored behavior data to select an appropriate peripheral device for use as the active device. For example, the device control engine may select an appropriate peripheral device based on one or more criteria, such as user preference, the application, time of day, location, etc.

For the purposes of this description, the terms "active device" and "selected device" may be used interchangeably. As used herein, both such terms refer to a device that is currently in use by the computing system such that input and/or output data is being transferred between the device and the computing system. In some implementations, when one device is the active device, other connected devices of a similar type may be unable to transfer input and/or output data to and/or from the computing system to prevent conflicts.

For the purposes of this description, the term "connected device" refers to a device with an established communication channel to the computing system which would, if the computing system made the device the active device, allow for input and/or output of data between the device and the computing system. The manner in which such a communication channel is established may vary based on the type of connection. For example, a peripheral device with a wired connection, such as a connection through Universal Serial Bus (USB) port or a headphone jack, may have an established communication channel with the computing system as long as the wired device is physically plugged into an appropriate port or jack of the computing system.

Wireless peripheral devices may utilize wireless technologies such as Wi-Fi, Bluetooth, radio frequency (RF), Zigbee, etc. A technology such as Bluetooth requires the device and the computing system to be paired. This establishes that permission is granted for the device and computing system to communicate. After being paired, the device and computing system are capable of communicating, and thus being a connected device, only when the device is within a physical range of the computing system. For wireless devices, the computing system may be aware of various wireless devices, such as if the wireless device and computing system are paired, but the wireless device is a connected device for the computing system only when the wireless device is within range of the computing system such that a communication channel can be established. Depending on the type of device, the computing system, or operating system of the computing system, may determine that communication is possible with multiple devices, such as a wired headset and a Bluetooth headset that is within range of the computing system. In such a circumstance, the computing system/operating system may have multiple connected devices of the same type, and one of those connected devices may need to be selected as the active device for a particular type of input and/or output (e.g., audio input/output for a video conferencing application).

FIG. 1A is a high-level diagram illustrating an example system for automatic transfer of peripheral device operations, from among a plurality of simultaneously connected peripheral devices, such as a wired device 108 and a wireless device 110, as the active device for use with an application 106, in accordance with some aspects of the present disclosure. As shown, the computing system 100 may be operated by a user 102, and may include one or more applications 106 which may be configured to enable the user 102 to perform various tasks with the computing system 100. The computing system 100 may, for example, be a client device 202, such as described below. Examples of components that may be used to implement the computing system 100, as well as examples of computing environments in which such components may be deployed, are described below in connection with FIGS. 2-4.

In the example implementation shown in FIG. 1A, multiple similar peripheral devices, including the wired device 108 and the wireless device 110, are simultaneously connected to computing system 100. In the illustrated example, the wired device 108 and the wireless device 110 are both headsets that include speakers for providing audio to the user 102 and a microphone for receiving audio from the user 102. The computing system 100 and/or the application 106 may be configured such that the user 102 can utilize only one of these devices at a time. Accordingly, one of the peripheral devices 108, 110 may need to be designated as the active device while the other remains inactive.

As shown, the computing system 100 may include a device control engine 104 that monitors the peripheral devices 108, 110 to determine which device the user 102 is presently using. As described in more detail below, the device control engine 104 may, for example, receive one or more sensor inputs, such as images captured from a camera, audio received from a microphone, Bluetooth® signal strength, etc., to make a determination about the presently utilized peripheral device 108, 110. The device control engine 104 may access a database 112 to retrieve information about the user 102 and the peripheral devices 108, 110 connected to the computing system 100. For example, the database 112 may include data identifying a preferred headset of the user 102. As explained in more detail below, the preferred headset may be the headset that the device control engine 104 initially selects as the active device until the device control engine 104 determines which headset the user 102 is presently using.

FIG. 1A further shows an example process 120 the device control engine 104 may perform. At an operation 122 of the process 120, while both a first device of a first type and a second device of the first type are simultaneously connected to a client device 202, the device control engine 104 may use the first device, rather than the second device, as an active device of the first type for at least one application 106, the first device and the second device being peripheral devices. The user 102 may initially use one of the peripheral devices connected to the computing system 100, such as wireless device 110. The device control engine 104 may indicate the wireless device 110 as the active device for the application 106 and/or the computing system 100 in a default manner. The device control engine 104 may, for example, select the wireless device 110 as the active device based on the wireless device 110 having been identified as the default or preferred device, e.g., based on data stored in the database 112.

A device type may be based at least in part on the functionality of a device or at least in part on the input and output of the device. For example, a device type may be based at least in part on the functionality of capturing images, such as a camera. In another example, a device type may be based at least in part on providing audio output, such as a headset or speaker. The headset and speaker, while different in form, both provide the same functionality of audio output, and thus may be considered the same device type for the computing system 100. Thus, a first device of a first type and a second device of the first type, for example, may present when the wireless device 110 and the wired device 108 are both audio devices that are simultaneously connected to the computing system 100.

The user 102 may switch from using the wireless device 110 to the wired device 108. For example, the charge on the battery in the wireless device 110 may expire, thus prompting the user 102 to switch to the wired device 108 as a backup. At an operation 124 of the process 120, while both the first device and the second device remain connected to the client device 202, the device control engine 104 may determine a switch from the first device (e.g., the wireless device 110) to the second device (e.g., the wired device 108) by a user 102. For example, the device control engine 104 may determine that a signal is no longer being received from the wireless device 110, such as when the device powers down. The device control engine 104 may attempt to determine which device the user 102 is using presently. For example, a camera may be used to capture images of the user 102 to determine that wired device 108 is in use. In another example, movement sensor signals from a device, such as from a gyroscope or accelerometer, may be received that indicate the user 102 has picked up wired device 108.

At an operation 126 of the process 120, based at least in part on the switch from the first device (e.g., the wireless device 110) to the second device (e.g., the wired device 108), the device control engine 104 may use the second device (e.g., the wired device 108), rather than the first device (e.g., the wireless device 110), as the active device of the first type for the at least one application 106. For example, the user 102 may be using an application 106 for playing music. Based on determining the user 102 has switched from the wireless device 110 to the wired device 108, the device control engine 104 may select the wired device 108 as the active device such that the computing system 100 performs operations, such as providing the music from application 106, to the wired device 108.

The wired device 108 and the wireless device 110 are provided as examples of two different styles of the same type of device, but the systems and techniques offered here are limited to these two options. For example, a user 102 may have two wireless devices of the same type connected simultaneously. In this instance, data such as signal strength may be used to determine the device presently in use. Further, in some implementations, one or more devices may be integrated into the computing system 100, such as a laptop computer with built-in microphone and speakers. In such implementations, the device control engine 104 may select the active device from among one or more integrated devices and one or more external devices of the same type, or/or from among multiple different integrated devices of the same type.

Figure 1B:
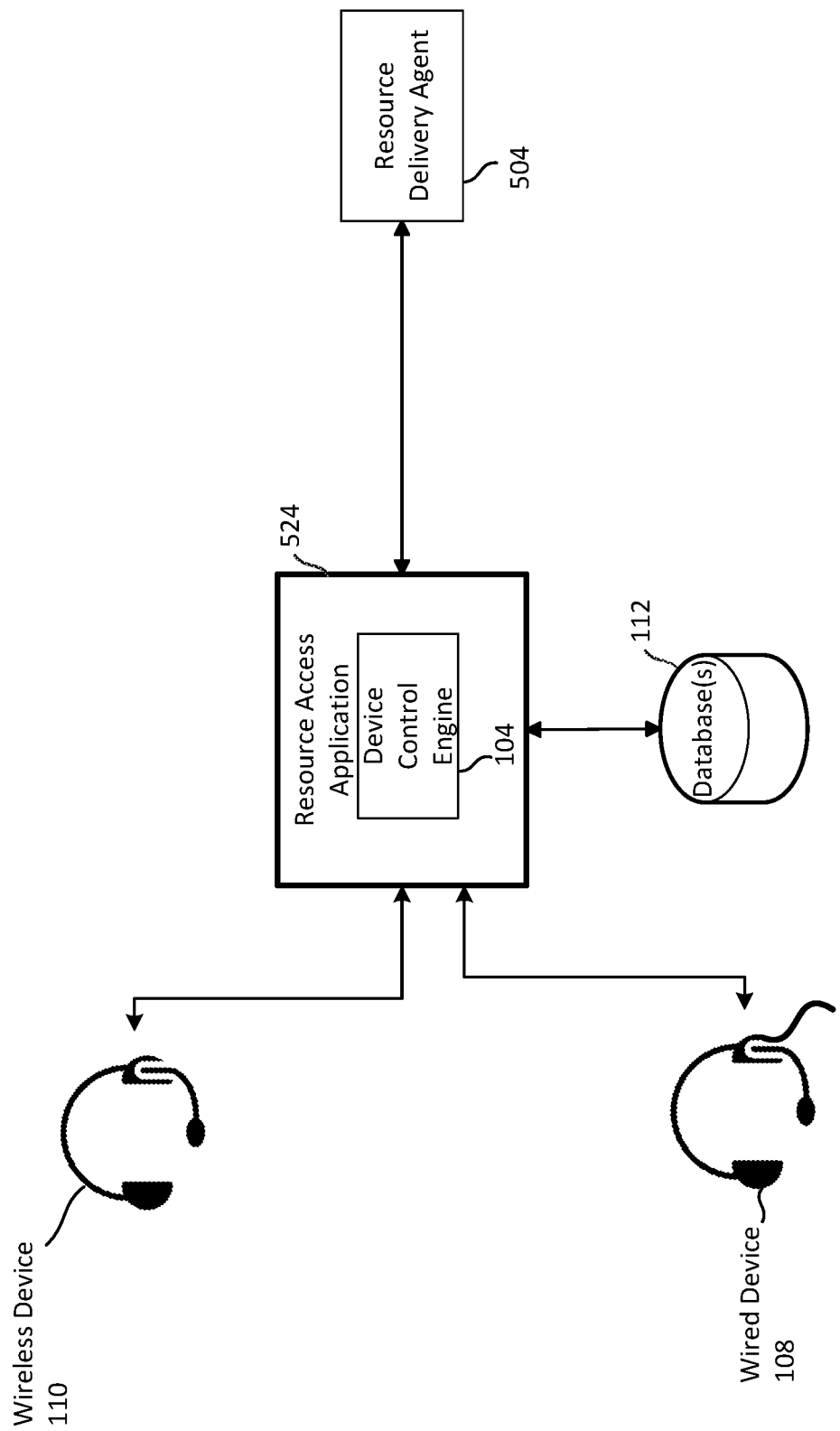
FIG. 1B illustrates an example embodiment of the system for automatic transfer of peripheral device operations, from among a plurality of simultaneously connected peripheral devices, such as a wired device and a wireless device, as the active device for use in a virtual workspace, in accordance with some aspects of the present disclosure.

FIG. 1B illustrates an example embodiment of the system for automatic transfer of peripheral device operations, from among a plurality of simultaneously connected peripheral devices, such as a wired device 108 and a wireless device 110, as the active device for use in a virtual workspace, in accordance with some aspects of the present disclosure. In some implementations, the computing system 100 may include a client device 202 to which a virtual application or desktop is delivered by a remote computing system, such as a shared computing resource 502 (described below in Section E). As explained in more detail below, in some such implementations, at least a portion of the device control engine 104 may be included within a resource access application 524 that the client device 202 uses to access the application or desktop delivered by a resource delivery agent 504 of a shared computing resource 502. When, in such implementations, the device control engine 104 determines that user has switched from using one peripheral device of the client device 202 (e.g., the wireless device 110) to another simultaneously connected peripheral device of the same type (e.g., the wired device 108), the device control engine 104 may cause the newly-used peripheral device to begin sending and/or receiving data over one or more virtual channels (e.g., as a part of the connection 548 described below in connection with FIG. 5C) established between the resource access application 524 and the resource delivery agent 504 for the type of peripheral device in question (e.g., an audio input/output device). In addition, in some implementations, the device control engine 104 may inform the resource delivery agent 504 of the newly-used peripheral device that will be sending and/or receiving data over such virtual channel(s), thus allowing the delivered application or desktop to properly communicate with the newly-used peripheral device via the virtual channel(s).

Figure 1C:
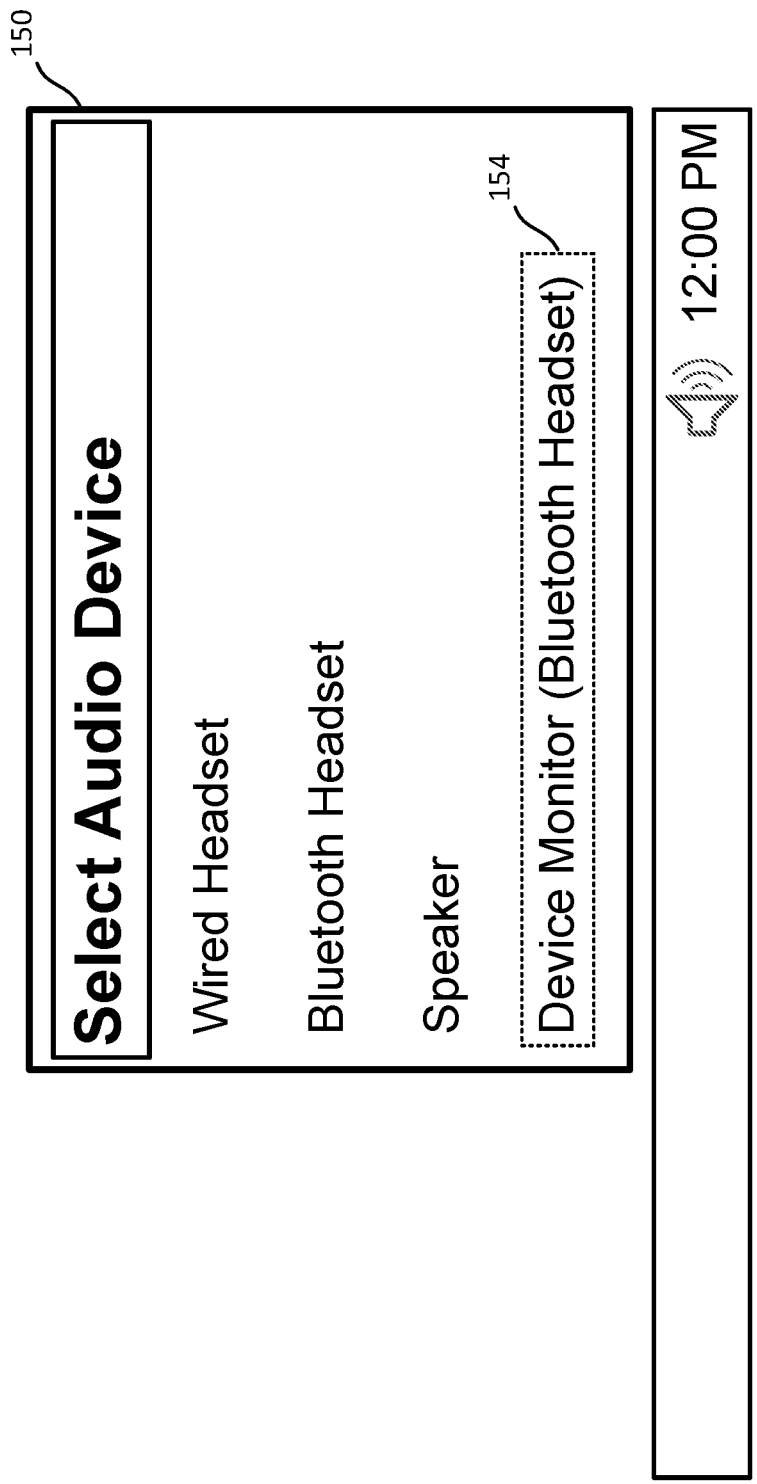
FIG. 1C illustrates a first example user interface showing a setting to automatically transfer operations between a plurality of peripheral devices simultaneously connected to a computing device, in accordance with some embodiments of the present disclosure.

FIG. 1C illustrates a first example user interface showing a setting to automatically transfer operations between a plurality of peripheral devices simultaneously connected to a computing device, in accordance with some embodiments of the present disclosure. The illustrated user interface may be presented, for example, by a computing system 100 that includes a device control engine 104 (e.g., as shown in FIG. 1A). As shown, the list 150 of connected devices may be supplemented to include a device monitor option 154 as one of the selectable peripheral devices. As explained in more detail below, selecting the device monitor option 154 may trigger the device control engine 104 to automatically transfer operations to a connected peripheral device as the active device for the computing system 100 and/or the application 106. In the circumstance illustrated in FIG. 1C, the text of the device monitor option 154 indicates that the Bluetooth Headset is the presently active device, based on the automated selection process employed by the device control engine 104.

Figure 1D:
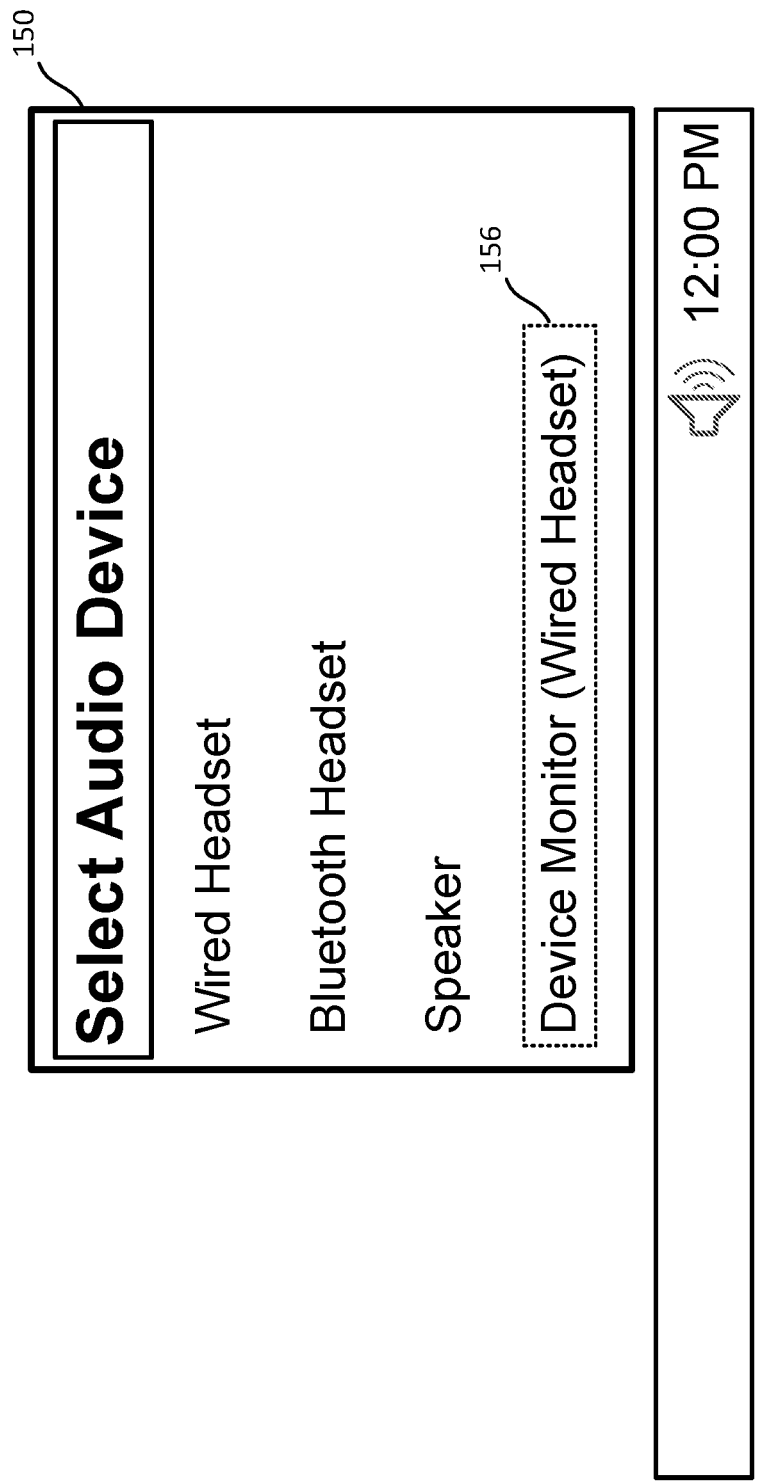
FIG. 1D illustrates a second example user interface showing a setting to automatically transfer operations between a plurality of peripheral devices simultaneously connected to a computing device, in accordance with some embodiments of the present disclosure.

FIG. 1D illustrates a second example user interface showing a setting to automatically transfer operations between a plurality of peripheral devices simultaneously connected to a computing device, in accordance with some embodiments of the present disclosure. FIG. 1D illustrates the same user interface as FIG. 1C, but for a circumstance in which the device control engine 104 detected that the user 102 has switched peripheral devices. The list 150 shown in FIG. 1D still indicates that the device monitor option 156 is selected, but indicates the active device, as determined by the automated selection process performed by the device control engine 104, is now the wired headset, rather than the Bluetooth headset. That change may be indicated, for example, because the device control engine 104 may have determined that the user 102 switched from using the Bluetooth headset to using the wired headset, and thus may have automatically switched the active device from the Bluetooth headset to the wired headset, without requiring the user 102 to make a manual selection of the different active device in list 150. In some implementations, a notification may be displayed in the user interface to notify the user 102 that the device control engine 104 has detected a switch between the peripheral devices. The notification may include identification of the presently active device. In some implementations, the notification may prompt the user 102 to confirm the device presently identified as the active device. In such an implementation, the user 102 may reject the device identified in the notification as the presently active device, thus prompting the device control engine to return the previous device as the designated active device.

The device control engine 104 may be located at any of a number of locations within the computing system 100. In some implementations, for example, the device control engine 104 may be included, in whole or in part, as a part of an operating system of a client device 202 or a shared computing resource 502. Additionally or alternatively, in some implementations, the device control engine 104 may be implemented, in whole or in part, as part of an application with which an automatically selected peripheral device is to be used. As yet another alternative, the device control engine 104 may be deployed as one or more separate applications executed on a client device 202 and/or a shared computing resource 502. When implemented as part of an application with which an automatically selected peripheral device is to be used, the device control engine 104 may monitor device usage for devices that relate to the application. For example, a music application may monitor headphone usage but would not monitor camera usage by the user. Such an application level device control engine 104 may monitor usage of devices and identify which device is the active device for the application. When the application is executing or in use by the computing system 100, the device control engine 104 for the application may select an active device for the application from devices that are applicable to the application.

Additional details and example implementations of embodiments of the present disclosure are set forth below in Section F, following a description of example systems and network environments in which such embodiments may be deployed.

B. Network Environment

Figure 2:
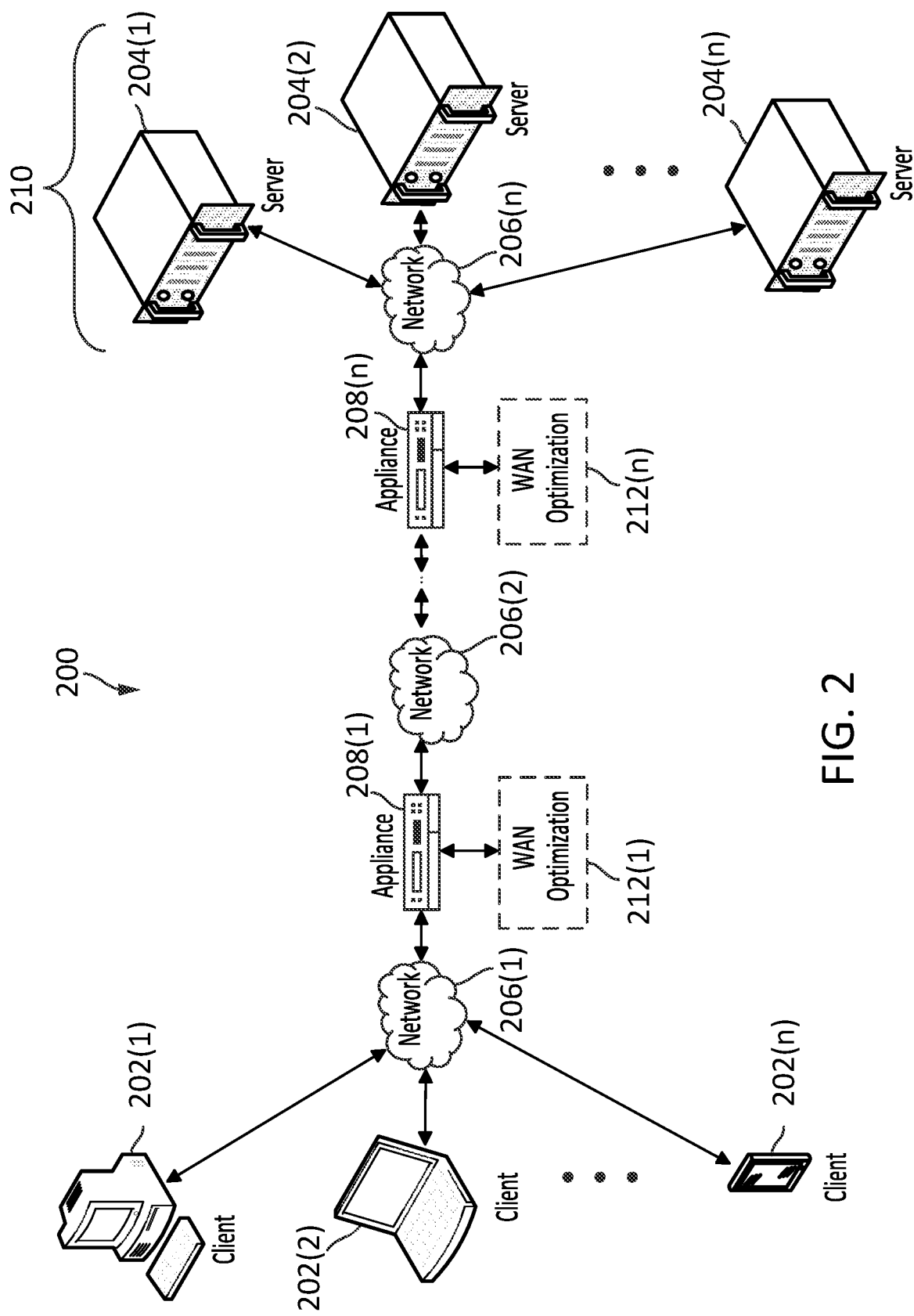
FIG. 2 is a diagram of a network environment in which some embodiments of the system for automatically selecting a peripheral device disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of an organization.

C. Computing Environment

Figure 3:
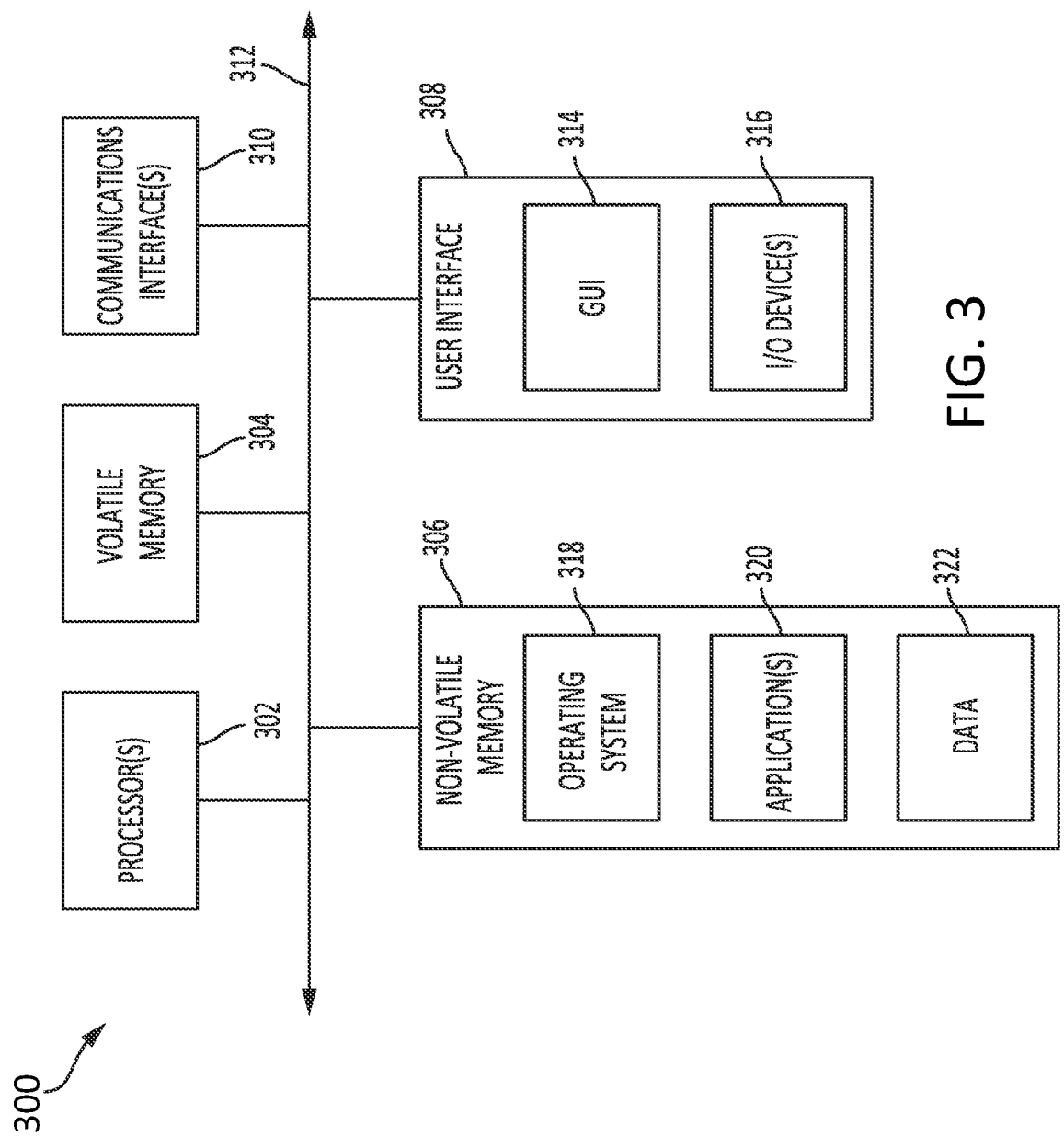
FIG. 3 is a block diagram of a computing system that may be used to implement one or more of the components of the computing environment shown in FIG. 2 in accordance with some embodiments of the present disclosure.
Figure 4:
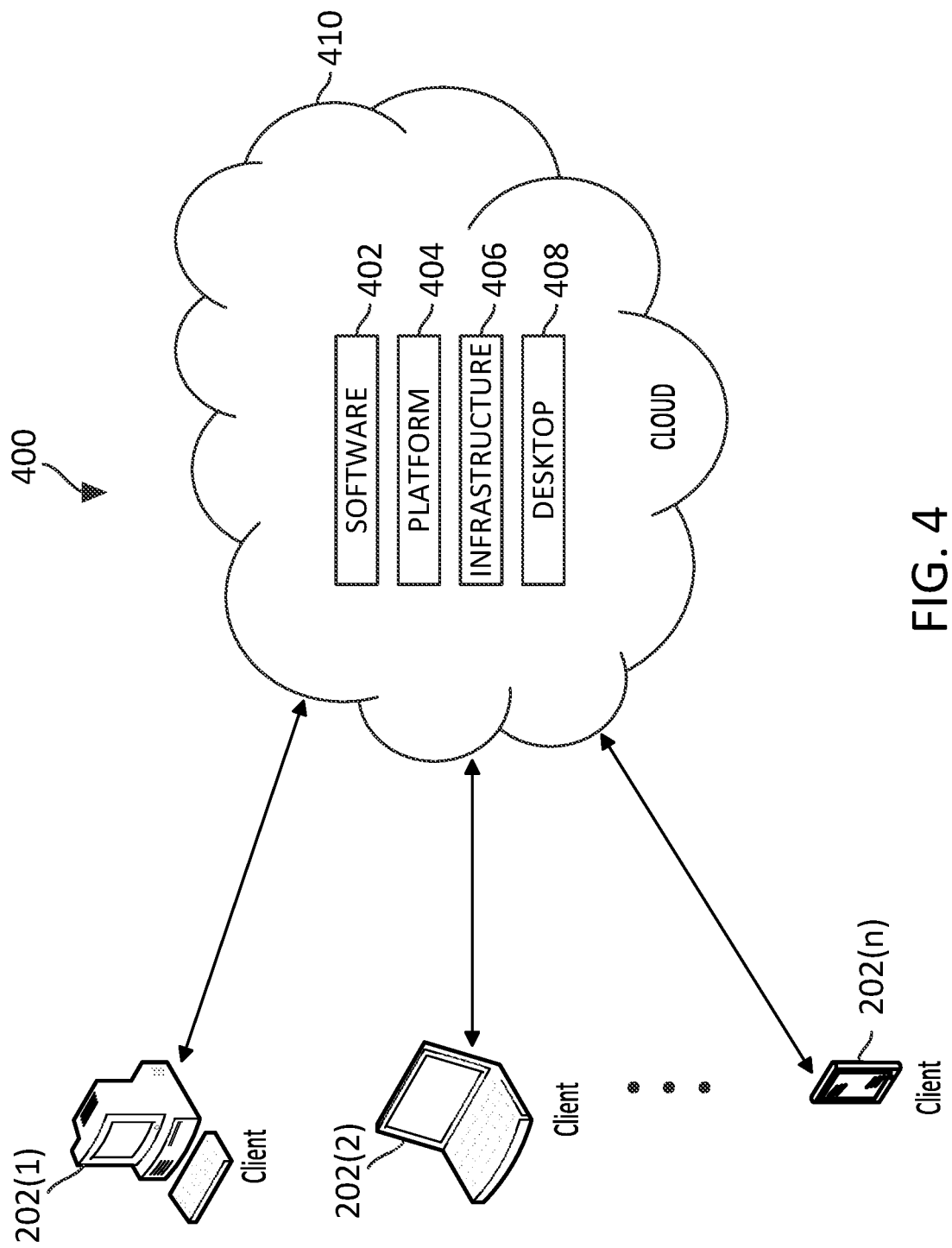
FIG. 4 is a schematic block diagram of a cloud computing environment in which various aspects of the disclosure may be implemented.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 410. The cloud network 410 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Washington, Azure IaaS provided by Microsoft Corporation or Redmond, Washington, RACKSPACE CLOUD provided by Rackspace US, Inc., of San Antonio, Texas, Google Compute Engine provided by Google Inc. of Mountain View, California, and RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile® from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files, and desktops together (whether on-premises or in the cloud) to deliver a unified experience.

Figure 5A:
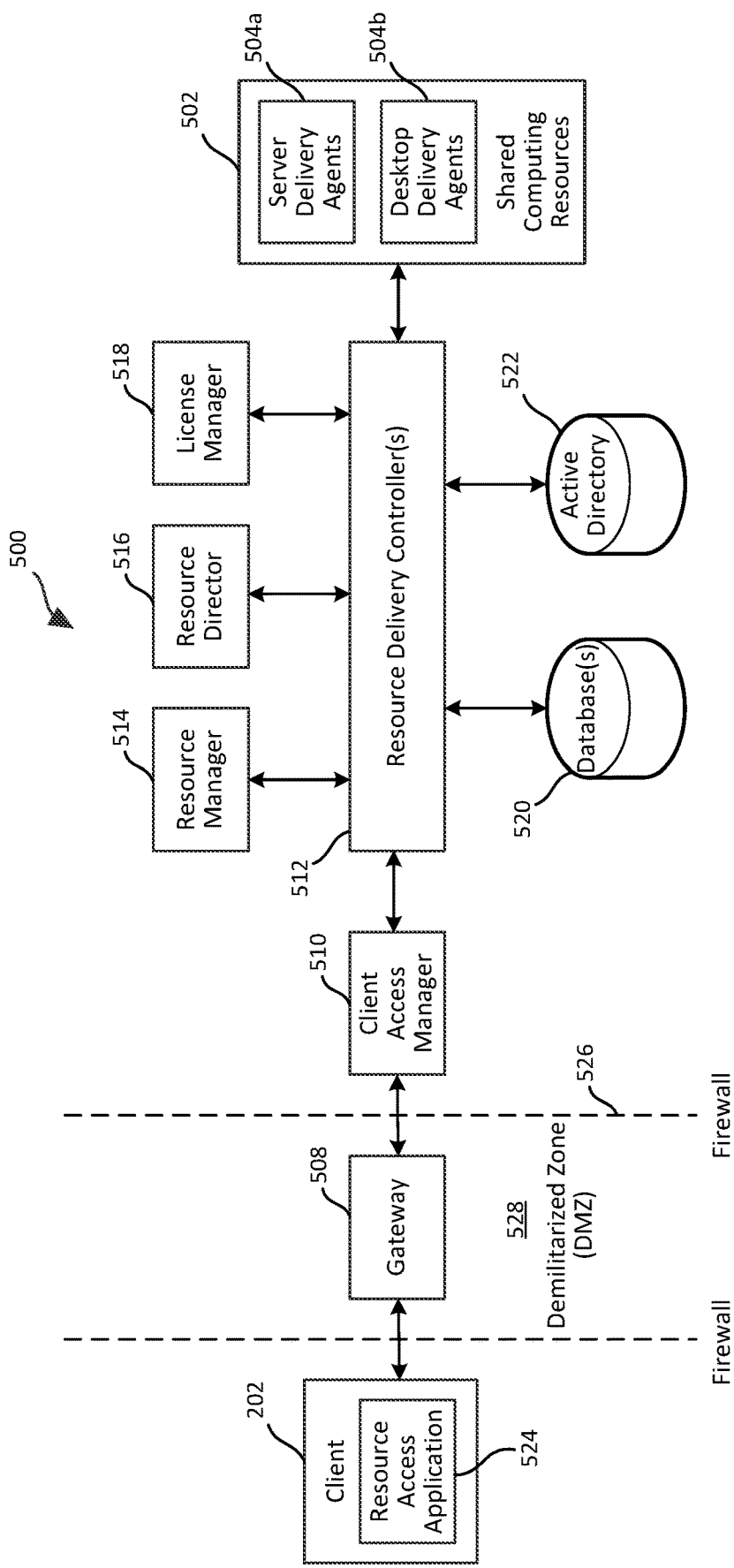
FIG. 5A is a block diagram illustrating key components of a resource delivery system which may be useful for practicing embodiments described herein.

E. Systems and Methods for Delivering Virtualized Applications and/or Desktops to Client Devices FIG. 5A is a block diagram illustrating key components of a resource delivery system 500 that may enable a client device 202 to remotely access one or more virtual applications or desktops running on one or more shared computing resources 502. The shared computing resources 502 may include physical machines and/or virtual (e.g., hypervisor driven) machines, and may be located at a data center, within a cloud computing environment, or elsewhere. As described in more detail below, such shared computing resources 502 may implement one or more resource delivery agents 504, including one or more server delivery agents 504a and/or one or more desktop delivery agents 504b. The Virtual Delivery Agents (VDAs) of the Citrix Virtual Apps and Desktops™ system offered by Citrix Systems, Inc., of Fort Lauderdale, Florida, are example implementations of the resource delivery agents 504. In some implementations, the resource delivery system 500 may give an information technology (IT) department of an organization control of virtual machines, applications, licensing, and security while providing "anywhere access" for any device. As described below, the resource delivery system 500 may enable end users to run applications and/or desktops independently of the operating system and interface of the end user's device. Further, the resource delivery system 500 may enable administrators to manage the network and control access from selected devices or from all devices, as well as to manage an entire network from a single data center.

The resource delivery system 500 shown in FIG. 5A may, for example, correspond to an implementation of a Citrix Virtual Apps and Desktops™ system offered by Citrix Systems, Inc., of Fort Lauderdale, Florida. Such systems employ a unified architecture called FlexCast Management Architecture (FMA). Among other things, FMA provides the ability to run multiple versions of Citrix Virtual Apps or Citrix Virtual Desktops™ as well as integrated provisioning.

As shown in FIG. 5A, in addition to the shared computing resources 502, the resource delivery system 500 may include a gateway 508, a client access manager 510, one or more resource delivery controllers 512, a resource manager 514, a resource director 516, a license manager 518, one or more databases 520, and an Active Directory (AD) 522 or other directory service.

The resource delivery controller(s) 512 may be the central management component of the resource delivery system 500. In some implementations, the resource delivery controller(s) 512 may be installed on at least one server in a data center of an organization. The Delivery Controller of the Citrix Virtual Apps and Desktops™ system offered by Citrix Systems, Inc., of Fort Lauderdale, Florida, is one example implementation of the resource delivery controller(s) 512. For reliability and availability, respective resource delivery controllers 512 may be installed on multiple servers. The resource delivery controller(s) 512 may communicate with the shared computing resources 502 to distribute applications and/or desktops, authenticate and manage user access, broker connections between client devices 202 and resource delivery agents 504 running on respective shared computing resources 502, optimize use connections, and/or load-balance use connections. As described in more detail below, a broker service 532 (shown in FIGS. 5B-5D) of the resource delivery controller(s) 512 may interact with the database(s)

520 to track which users are logged on and where, what session resources the users have, and if users need to reconnect to existing applications. In some implementations, the broker service 532 may execute PowerShell commands and communicate with broker agents 556 (shown in FIG. 5D) of the resource delivery agents 504 over transmission control protocol (TCP) port "80." A monitor service 560 (shown in FIG. 5D) may also be provided by the resource delivery controller(s) 512 to collect historical data concerning the operation of the resource delivery controller(s) 512 and write such data to the database(s) 520. In some implementations, such a monitor service 560 may use TCP port "80" or "443."

The resource delivery controller(s) 512 may manage the state of desktops, starting and stopping them based on demand and administrative configuration. In some implementations, the resource delivery controller(s) 512 may also enable the adjustment of user profiles (stored within the database(s) 520) to manage user personalization settings in virtualized or physical Windows environments.

In some implementations, the database(s) 520 may include at least one Microsoft Structured Query Language (SQL) Server database in which configuration and session information may be stored. As noted above, the database(s) 520 may store the data collected and managed by the services that make up the resource delivery controller(s) 512. In some implementations, the database(s) 520 may be provided within a data center of an organization and may have a persistent connection to the resource delivery controller(s) 512. Although not illustrated in FIG. 5A, it should be appreciated that the resource delivery system 500 may also include respective databases associated with the resource manager 514, the resource director 516, and the license manager 518 to store data collected and/or used by those components.

The resource delivery agents 504 may be installed on physical or virtual machines that are made available to deliver applications or desktops to users. The resource delivery agents 504 may enable such machines to register with the resource delivery controller(s) 512. The registration of a machine with the resource delivery controller(s) 512 may cause that machine and the resources it is hosting to be made available to users. The resource delivery agents 504 may establish and manage the connections between the machines on which they are installed and client devices 202. The resource delivery agents 504 may also verify that a license is available for the user and/or session, and may apply policies that are configured for the session.

The resource delivery agents 504 may communicate session information to the broker service 532 (shown in FIGS. 5B-5D) of the resource delivery controller(s) 512 through the broker agents 556 (shown in FIG. 5D) in the resource delivery agents 504. Such broker agents 556 may host multiple plugins and collect real-time data. In some implementations, the broker agents 556 may communicate with the resource delivery controller(s) 512 over TCP port "80." In some implementations, the resource delivery agents 504 may operate with Single-session and/or Multi-session Windows operating systems. The resource delivery agents 504 for Multi-session Windows operating systems may allow multiple users to connect to the server at one time. The resource delivery agents 504 for Single-session Windows operating systems, on the other hand, may allow only one user to connect to the desktop at a time. In some implementations, one or more the resource delivery agents 504 may alternatively operate with a Linux operating system.

When users connect from outside one or more corporate firewalls, e.g., firewalls 526a and 526b shown in FIG. 5A, the gateway 508 may be used to secure such connections with Transport Layer Security (TLS). The gateway 508 may, for example, be a Secure Socket Layer (SLL) Virtual Private Network (VPN) appliance that is deployed in a demilitarized zone (DMZ) 528. The gateway 508 may thus provide a single secure point of access through the corporate firewall 526.

The client access manager 510 of the resource delivery system 500 may authenticate users and manage stores of desktops and/or applications that are available for users to access. In some implementations, the client access manager 510 may provide an application "storefront" for an enterprise, which may provide users with self-service access to the desktops and/or applications that the enterprise opts to make available to them. In some implementations, the client access manager 510 may also keep track of users' application subscriptions, shortcut names, and other data. Tracking such data may, for example, help ensure that users have a consistent experience across multiple devices.

As shown in FIG. 5A, a resource access application 524 may be installed on client devices 202 or other endpoints (such as virtual desktops). Such resource access applications 524 may provide users with quick, secure, self-service access to documents, applications, and/or desktops. The resource access application 524 may, for example, provide on-demand access to Windows, web, and/or Software as a Service (SaaS) applications. The Citrix Workspace™ app, offered by Citrix Systems, Inc., of Fort Lauderdale, Florida, is one example implementation of such a client-based version of the resource access application 524. In some implementations, the resource access application 524 may alternatively operate on a web server (not shown in FIG. 5A) and may be accessed using a web browser (also not shown in FIG. 5A) installed on the client device 202. In some embodiments, for example, the resource access application 524 may be provided as a hypertext markup language 5 (HTML5) service and may be accessed using an HTML5-compatible web browser. The Citrix Workspace™ app for HTML5, offered by Citrix Systems, Inc., of Fort Lauderdale, Florida, is one example implementation of such a web-based version of the resource access application 524.

In some embodiments, the resource access application 524 may intercept network communications from a network stack used by the one or more applications. For example, the resource access application 524 may intercept a network communication at any point in a network stack and redirect the network communication to a destination desired, managed, and/or controlled by the resource access application 524, for example, to intercept and redirect a transport layer connection to an IP address and port controlled and/or managed by resource access application 524. The resource access application 524 may thus, in some embodiments, transparently intercept any protocol layer below the transport layer, such as the network layer, and any protocol layer above the transport layer, such as the session, presentation, or application layers. The resource access application 524 may, for example, interface with the transport layer to secure, optimize, accelerate, route, and/or load-balance any communications provided via any protocol carried by the transport layer.

In some embodiments, the resource access application 524 may be implemented as an Independent Computing Architecture (ICA) client developed by Citrix Systems, Inc. The resource access application 524 may perform acceleration, streaming, monitoring, and/or other operations. For example, the resource access application 524 may accelerate streaming an application from a shared computing resource 502 running a resource delivery agent 504 to the client device 202. The resource access application 524 may also perform endpoint detection/scanning and/or collect endpoint information about the client 202. For example, the resource access application 524 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The resource manager 514 shown in FIG. 5A, may provide a console from which the configuration and management of applications and desktops that are to be made available to users may be controlled. The Studio component of the Citrix Virtual Apps and Desktops™ system offered by Citrix Systems, Inc., of Fort Lauderdale, Florida, is one example implementation of the resource manager 514. In some implementations, the resource manager 514 may eliminate the need for separate management consoles for managing delivery of applications and desktops. In some embodiments, the resource manager 514 may provide one or more wizards to guide system administrators through environment setup, creating workloads to host applications and desktops, and assigning applications and desktops to users. In some implementations, the resource manager 514 may also be used to allocate and track licenses for the resource delivery system 500. In some embodiments, the resource manager 514 may get the information it displays from the broker service 532 of the resource delivery controller(s) 512, e.g., communicating over TCP port "80."

The resource director 516 may, for example, be a web-based tool that enables IT support and help desk teams to monitor an environment, troubleshoot issues before they become system-critical, and perform support tasks for end users. The Director component of the Citrix Virtual Apps and Desktops™ system offered by Citrix Systems, Inc., of Fort Lauderdale, Florida, is one example implementation of the resource director 516. In some implementations, a single deployment of the resource director 516 may be used to connect to and monitor multiple resource delivery systems 500, such as that shown in FIG. 5A. Examples of information that may be displayed by the resource director 516 include (A) real-time session data from the broker service 532 of the resource delivery controller(s) 512, which may include data the broker service 532 gets from the broker agent 556 in the resource delivery agents 504, and (B) historical data about the resource delivery system 522 that may be received, for example, from the monitor service 560 in the resource delivery controller(s) 512. In some implementations, the resource director 516 may use performance and heuristics data captured by the gateway 508 (described below) to build analytics from the data and then presents such analytics to system administrators. Further, in some implementations, the resource director 516 may allow system administrators to view and interact with a user's sessions, e.g., using Windows Remote Assistance.

The license manager 518, as its name implies, may enable the management of licenses within the resource delivery system 500. In some implementations, the license manager 518 may communicate with the resource delivery controller(s) 512 to manage licensing for a user's session and with the resource manager 514 to allocate license files.

As noted above, in some implementations, the shared computing resources 502 shown in FIG. 5A may include one or more virtual machines. These can be virtual machines that are used to host applications and/or desktops, as well as virtual machines that are used to host the other components of the resource delivery system 500. In some implementations, a hypervisor may be installed on a host computer to run the hypervisor and hosting virtual machines.

Although not depicted in FIG. 5A, in some implementations, the resource delivery system 500 may additionally include a performance monitoring service or agent. In some embodiments, one or more dedicated servers (or a dedicated service in a cloud-based environment) may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., as a part of the resource access application 524), one or more servers 204, or one or more other system component(s). In general, the monitoring agents may execute transparently (e.g., in the background) to any application and/or user of the device. In some embodiments, such a monitoring agent may be implemented as components of Citrix Analytics™ by Citrix Systems, Inc., of Fort Lauderdale, FL.

The monitoring agents may, for example, monitor, measure, collect, and/or analyze data on a frequency (e.g., a predetermined frequency), based upon an occurrence of given event(s), or in real time during operation of the resource delivery system 500. The monitoring agents may, for example, monitor resource consumption and/or performance of hardware, software, and/or communications resources of the clients 202, the gateway 508 (and/or any other components in the DMZ 528), and/or the resource delivery controller(s) 512, the shared computing resources 502, the resource delivery agents 504, or any other components shown in FIG. 5A. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

Figure 5B:
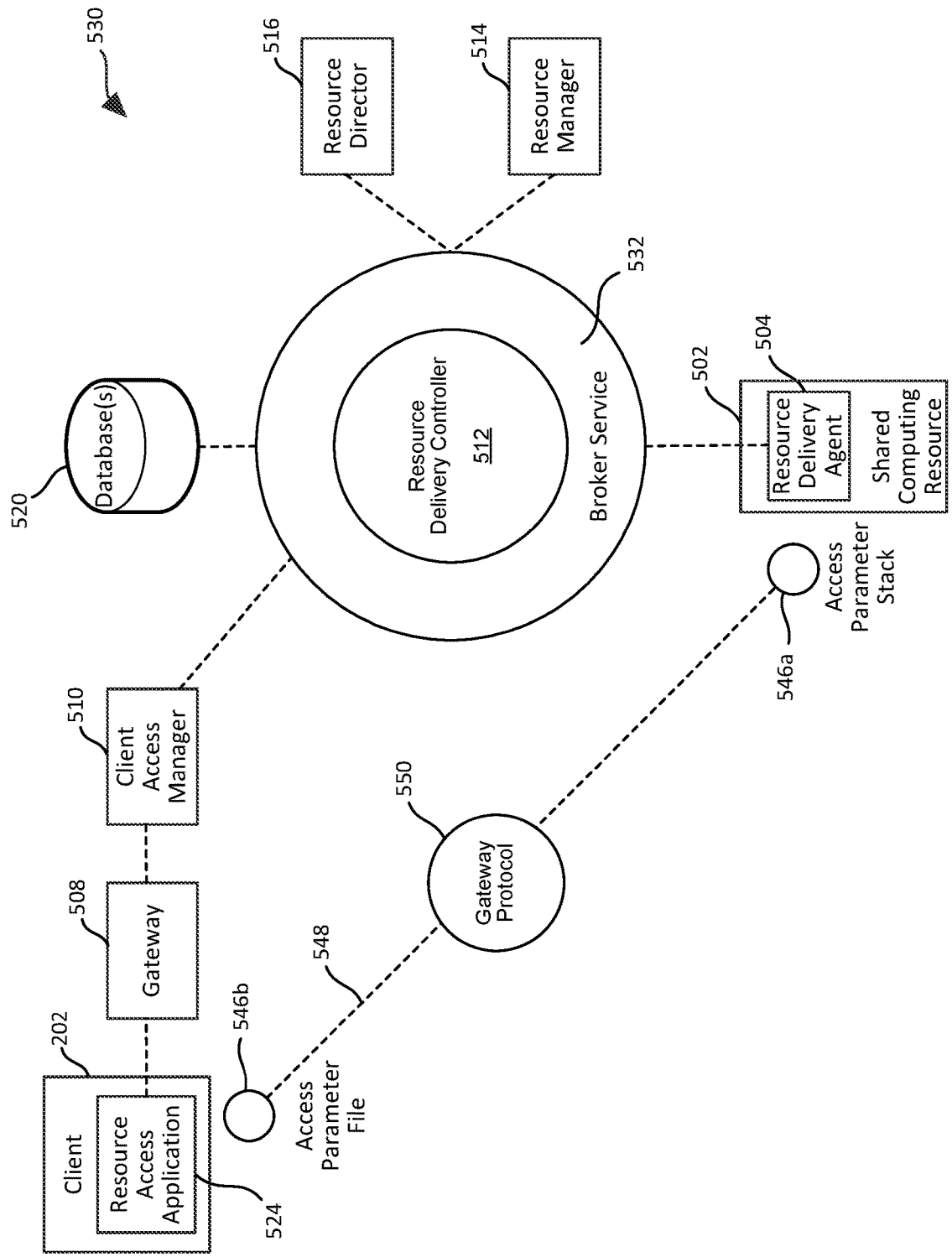
FIG. 5B illustrates an example deployment of a resource delivery system such as that shown in FIG. 5A.

The monitoring agents may provide application performance management for the resource delivery system 500. For example, based upon one or more monitored performance conditions or metrics, the resource delivery system 500 may be dynamically adjusted, for example periodically or in real-time, to optimize application delivery by the resource delivery agents 504 to the clients 202 based upon network environment performance and conditions FIG. 5B illustrates an example deployment 530 of a resource delivery system 500, such as that shown in FIG. 5A. Such a deployment may be referred to as a "Site." A Site may be made up of machines with dedicated roles that allow for scalability, high availability, and failover, and may provide a solution that is secure by design. As discussed above, such a Site may include servers and/or desktop machines installed with resource delivery agents 504, and one or more resource delivery controller(s) 512, which may manage access to such servers/machines. FIG. 5B illustrates one such resource delivery agent 504, and one such resource delivery controller 512. As shown in FIG. 5B, the resource delivery controller 512 may include a broker service 532.

The resource delivery agent 504 may enable users to connect to desktops and/or applications. It may be installed on server or desktop machines in a datacenter for most delivery methods, but it may also be installed on physical personal computers (PCs) for Remote PC Access. In some implementations, the resource delivery controller 512 may be made up of independent Windows services that may manage resources, applications, and/or desktops, and may optimize and balance user connections.

In some embodiments, client devices 202 may not directly access the resource delivery controller 512. Instead, the resource delivery agent 504 and the client access manager 510 may serve as intermediaries between client devices 202 and the resource delivery controller 512. When users log on using the client access manager 510, their credentials may pass through to the broker service 532 on the resource delivery controller 512. The broker service 532 may then obtain profiles and available resources based on the policies set for them.

Figure 5C:
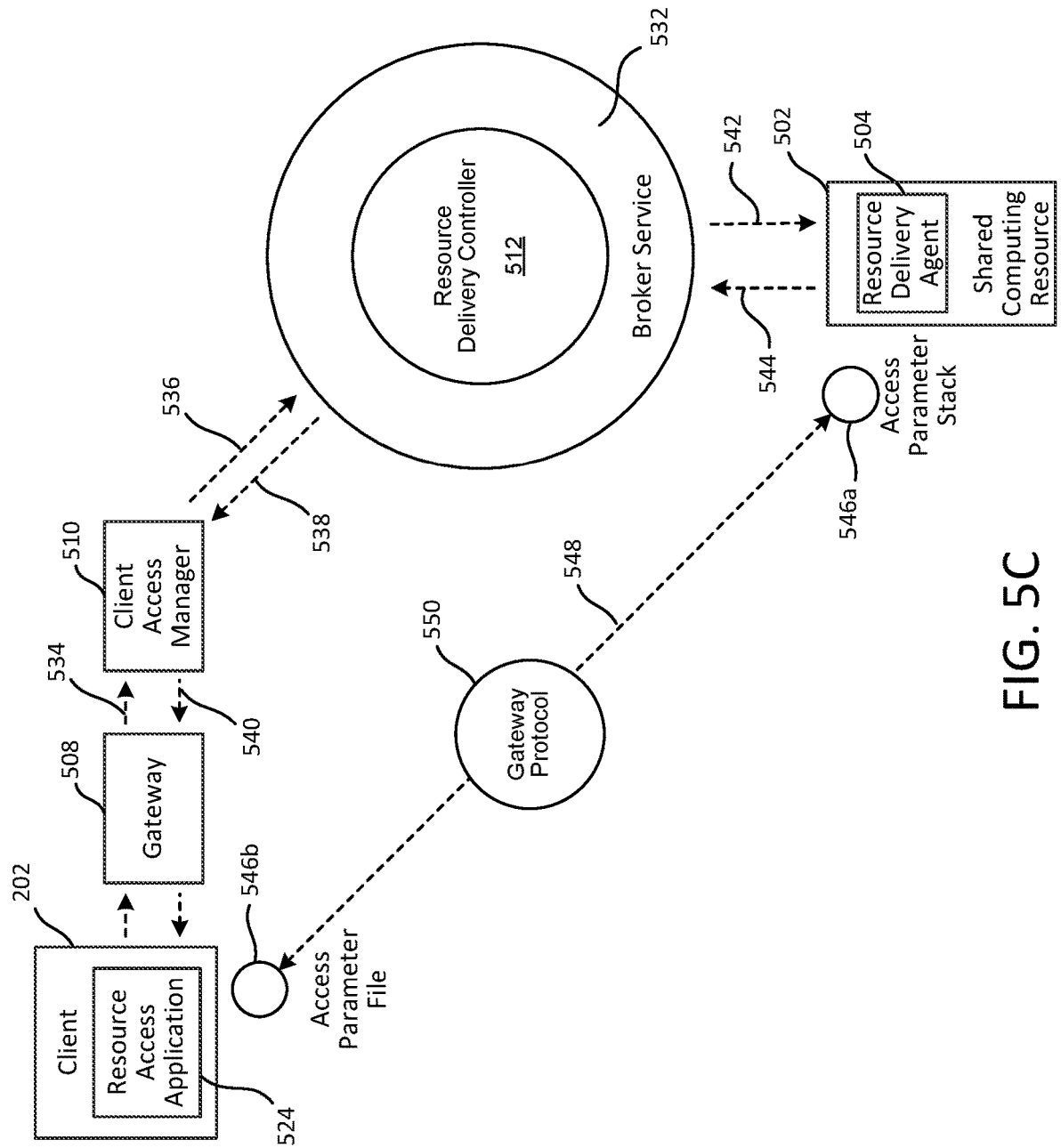
FIG. 5C illustrates an example process for handling user connections within the deployment shown in FIG. 5B.

FIG. 5C illustrates an example process for handling user connections within the deployment 530 shown in FIG. 5B. As indicated by arrows 534 and 535, to start a session, a user may cause the client device 202 to connect (via the gateway 508) to the client access manager 510. Such a connection may, for example, be established using the resource access application 524. As noted above, the resource access application 524 may either be installed on the client device 202 or accessible from a web server via a web browser on the client device 202.

As indicated by arrow 536, the user's credentials may then move through this pathway to access the broker service 532 of resource delivery controller 512. In some implementations, such communications may be encrypted to protect the security of such credentials. The broker service 532 may determine which desktops and/or applications the user is allowed to access. After the credentials have been verified, information about available applications and/or desktops may be sent back to the client device 202 through the pathway between the client access manager 510 and the resource access application 524, as indicated by arrows 538, 540, and 541. The user of the client device 202 may thus be provided with a list of available applications and/or desktops. When the user selects an application or desktop from this list, an indication of the selected resource goes back down the previously described pathway to the resource delivery controller 512. The resource delivery controller 512 may then select an appropriate resource delivery agent 504 to host the selected applications or desktop.

As indicated by arrow 542, the resource delivery controller 512 may send a message to the selected resource delivery agent 504 with the user's credentials, and may then send pertinent data about the user and the connection to the resource delivery agent 504. The resource delivery agent 504 may then accept the connection and, as indicated by arrows 544, 538, 540, and 541, may send a set of access parameters (stored in an access parameter stack 546a) back through the same pathways to the resource access application 524. In particular, the set of access parameters may be collected by the client access manager 510 and then sent to the resource access application 524 where they may be stored as an access parameter file 546b. In some implementations, the access parameter file 546b may be created as part of a protocol conversation between the client access manager 510 and the resource access application 524. In other implementations, the client access manager 510 may convert the access parameters to the file 546b, and that file 546b may then be downloaded to the client device 202. In some implementations, the access parameters may remain encrypted throughout this process.

The access parameter file 546b that is then stored on the client device 202 may be used to establish a direct connection 548 between the client device 202 and the access parameter stack 546a running on the resource delivery agent 504. As illustrated, the connection 548 between the client device 202 and the resource delivery agent 504 may use a gateway protocol 550. In some implementations, the gateway protocol 550 may include a feature that enables the client device 202 to immediately reconnect to the resource delivery agent 504 if the connection 548 is lost, rather than having to relaunch through the management infrastructure (including the client access manager 510, the resource delivery controller 512, etc.).

After the client device 202 connects to the resource delivery agent 504, the resource delivery agent 504 may notify the resource delivery controller 512 that the user is logged on. The resource delivery controller 512 may then send this information to the database(s) 520 (shown in FIGS. 5A, 5B and 5D) and the monitor service 560 (shown in FIG. 5D) of the delivery controller 512 may also start logging data in the database(s) 520.

Figure 5D:
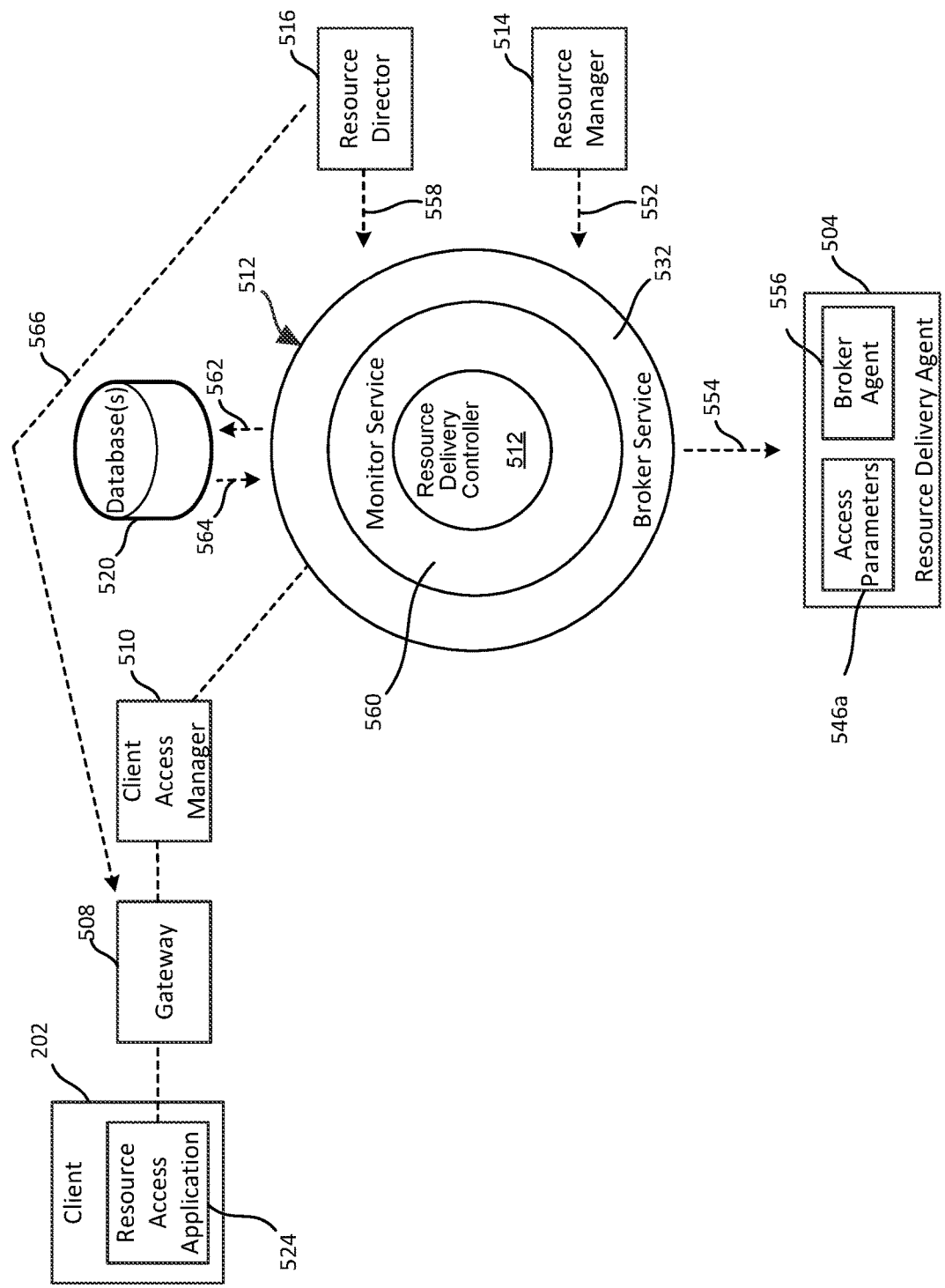
FIG. 5D shows examples of paths through which the resource manager and the resource monitor shown in FIG. 5B may access stored data.

Such sessions between client devices 202 and resource delivery agents 504 produce data that system administrators can access through the resource manager 514 and/or the resource director 516. FIG. 5D shows examples of paths through which the resource manager 514 and the resource director 516 may access such data in some embodiments. As indicated by the arrows 552 and 554, administrators may use the resource manager 514 to access real-time data from the broker agent 556 of a resource delivery agent 504 (via the broker service 532 of the resource delivery controller 512). The resource director 516 may access the same data, as indicated by arrows 558 and 554, plus any historical data the monitor service 560 of the resource delivery controller 512 stores in the database(s) 520, as indicated by arrows 558, 562 and 564. Further, as indicated by arrow 566, the resource director 516 may also access data from the gateway 508 for help desk support and troubleshooting.

Within the resource delivery controller 512, the broker service 532 may report session data for every session on the machine providing real-time data. The monitor service 560 may also track the real-time data and store it as historical data in the database(s) 520. In some implementations, the resource manager 514 may communicate with the broker service 532 and may access real-time data. The resource director 516 may communicate with the broker service 532 to access the database(s) 520.

An example process for enabling the delivery of applications and/or desktops will now be described. First, the machines that are to deliver applications and/or desktops may be set up with "Machine Catalogs." Then, "Delivery Groups" may be created that specify the applications and/or desktops that are to be made available (using machines in the Machine Catalogs), and which users can access them. In some implementations, "Application Groups" may also be created to manage collections of applications.

Machine Catalogs are collections of virtual or physical machines that can be managed as a single entity. These machines, and the application and/or virtual desktops on them, are the resources that may be made available to users. All the machines in a Machine Catalog may have the same operating system and the same resource delivery agent 504 installed. They may also have the same applications and/or virtual desktops.

In some implementations, a master image may be created and used to create identical virtual machines in the catalog. For virtual machines, the provisioning method may be specified for the machines in that catalog. Valid machine types may, for example, include "Multi-session OS," "Single-session OS," and "Remote PC access." A Multi-session OS machine is a virtual or physical machine with a multi-session operating system. Such a machine may be used to deliver published applications (also known as server-based hosted applications) and published desktops (also known as server-hosted desktops). These machines may allow multiple users to connect to them at one time. A Single-session OS machine is a virtual or physical machine with a single-session operating system. Such a machine may be used to deliver Virtual Desktop Infrastructure (VDI) desktops (desktops running single-session OSs that can optionally be personalized), virtual machine (VM)-hosted apps (applications from single-session OSs), and hosted physical desktops. Only one user at a time can connect to each of these desktops. A Remote PC access machine may enable remote users to access their physical office PCs from any device running the resource access application 524.

Delivery Groups may specify which users can access which applications and/or desktops on which machines. Delivery Groups may include machines from the Machine Catalogs, and Active Directory users who have access to the Site. In some implementations, users may be assigned to Delivery Groups by their Active Directory group, because Active Directory groups and Delivery Groups are ways to group users with similar requirements.

Delivery Groups may contain machines from more than one Machine Catalog, and Machine Catalogs may contribute machines to more than one Delivery Group. In at least some implementations, however, individual machines can only belong to one Delivery Group at a time.

The specific resources that users in the Delivery Group can access may be defined. For example, to deliver different applications to different users, all of the applications may be installed on the master image for one Machine Catalog and enough machines may be created in that catalog to distribute among several Delivery Groups. Delivery Groups may then be configured to deliver a different subset of applications that are installed on the machines.

Application Groups may provide application management and resource control advantages over using more Delivery Groups. Using a "tag restriction" feature, existing machines may be used for more than one "publishing" task, saving the costs of deployment and managing additional machines. A tag restriction can be thought of as subdividing (or partitioning) the machines in a Delivery Group. Application Groups may also be helpful when isolating and troubleshooting a subset of machines in a Delivery Group.

"Tags" may be strings that identify items such as machines, applications, desktops, Delivery Groups, Application Groups, and policies. After creating a tag and adding it to an item, certain operations may be tailored to apply to only items that have a specified tag.

In some implementations, tags may be used to tailor search displays is the resource manager 514. For example, to display only applications that have been optimized for testers, a tag named "test" may be created and may then be added (applied) to those applications. A search performed by the resource manager 514 may then be filtered with the tag "test".

In some implementations, tags may be used to "publish" applications from an Application Group or specific desktops from a Delivery Group, considering only a subset of the machines in selected Delivery Groups. Using an Application Group or desktops with a tag restriction may be helpful when isolating and troubleshooting a subset of machines in a Delivery Group.

In some implementations, tags may be used to schedule periodic restarts for a subset of machines in a Delivery Group. Using a tag restriction for machines may, for example, enable the use of new PowerShell cmdlets to configure multiple restart schedules for subsets of machines in a Delivery Group.

In some implementations, tags may be used to tailor the application (assignment) of particular policies to a subset of machines in Delivery Groups, Delivery Group types, or organizational units (OUs) of a Site that have (or do not have) a specified tag. For example, if a particular policy is to be applied only to the more powerful workstations, a tag named "high power" may be applied to those machines and the policy may be set to apply to only machines to which the high power tag has been applied. Tags may additionally or alternatively be applied to particular Delivery Groups and one or more policies may be set to apply only the Delivery Groups to which such tags have been applied.

In some embodiments, the resource manager 514 may be used to create or edit a tag restriction for a desktop in a shared Delivery Group or an Application Group. In some implementations, creating such a tag restriction may involve several steps. First, a tag may be created and then added (applied) to one or more machines. Second a group may be created or edited to include the tag restriction, thus restricting launches to machines with the applied tag. A tag restriction may extend the machine selection process of the broker service 532. In particular, the broker service 532 may select a machine from an associated Delivery Group subject to access policy, configured user lists, zone preference, and launch readiness, plus the tag restriction (if present). For applications, the broker service 532 may fall back to other Delivery Groups in priority order, applying the same machine selection rules for each considered Delivery Group.

Figure 5E:
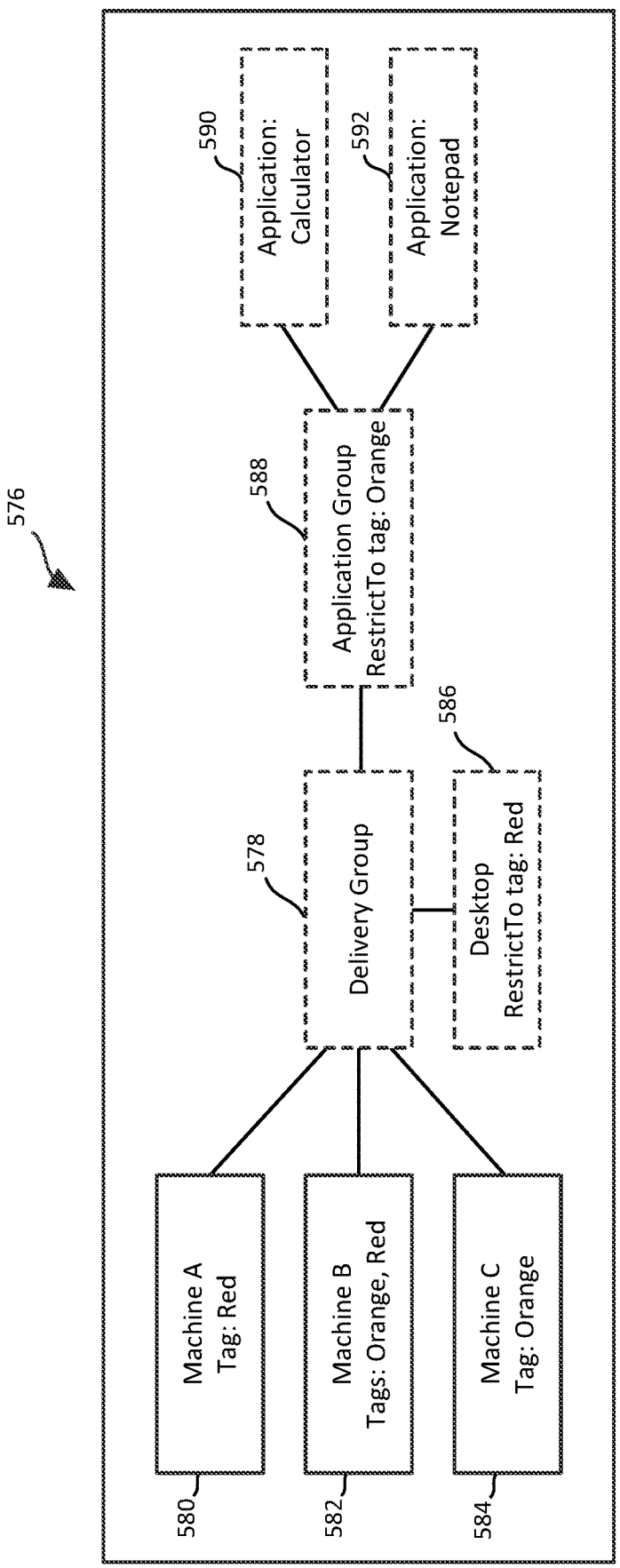
FIG. 5E illustrates a simple layout of a resource delivery system in which tag restrictions may be used to limit which machines will be considered for certain desktop and application launches.

FIG. 5E illustrates a simple layout in which tag restrictions may be used to limit which machines will be considered for certain desktop and application launches. In the illustrated example, a site 576 has one shared Delivery Group 578 configured with three machines 580, 582, 584 and one published desktop 586, and one Application Group 588 configured with two applications 590, 592. As shown, tags may be added to each of the three machines 580, 582, 584. A tag restriction named "Red" has been applied to the published desktop 586 in the shared Delivery Group 578, so that the published desktop 586 can be launched only on machines in that Delivery Group 578 that have the tag "Red," i.e., the machines 580 and 582. A tag restriction named "Orange" has been applied to the Application Group 588, so that each of its applications 590, 592 (Calculator and Notepad) can be launched only on machines in the Delivery Group 578 that have the tag "Orange," i.e., the machines 582 and 584. Since the machine 582 has both tags (Red and Orange), it can be considered for launching the applications 590, 592 and the desktop 586.

In some implementations, tags may be created, added (applied), edited, and/or deleted from selected items using the resource manager 514. Tag restrictions may, for example, be configured when creating or editing desktops in Delivery Groups and/or when creating or editing Application Groups.

As noted above, the resource delivery system 500 described in connection with FIGS. may provide virtualization solutions that give administrators control of virtual machines, applications, and security while providing anywhere access for any device. As was also noted above, the resource delivery system 500 may also enable end users to access applications and desktops independently of the operating systems and interfaces of the client devices 202 such end users are operating.

Figure 5F:
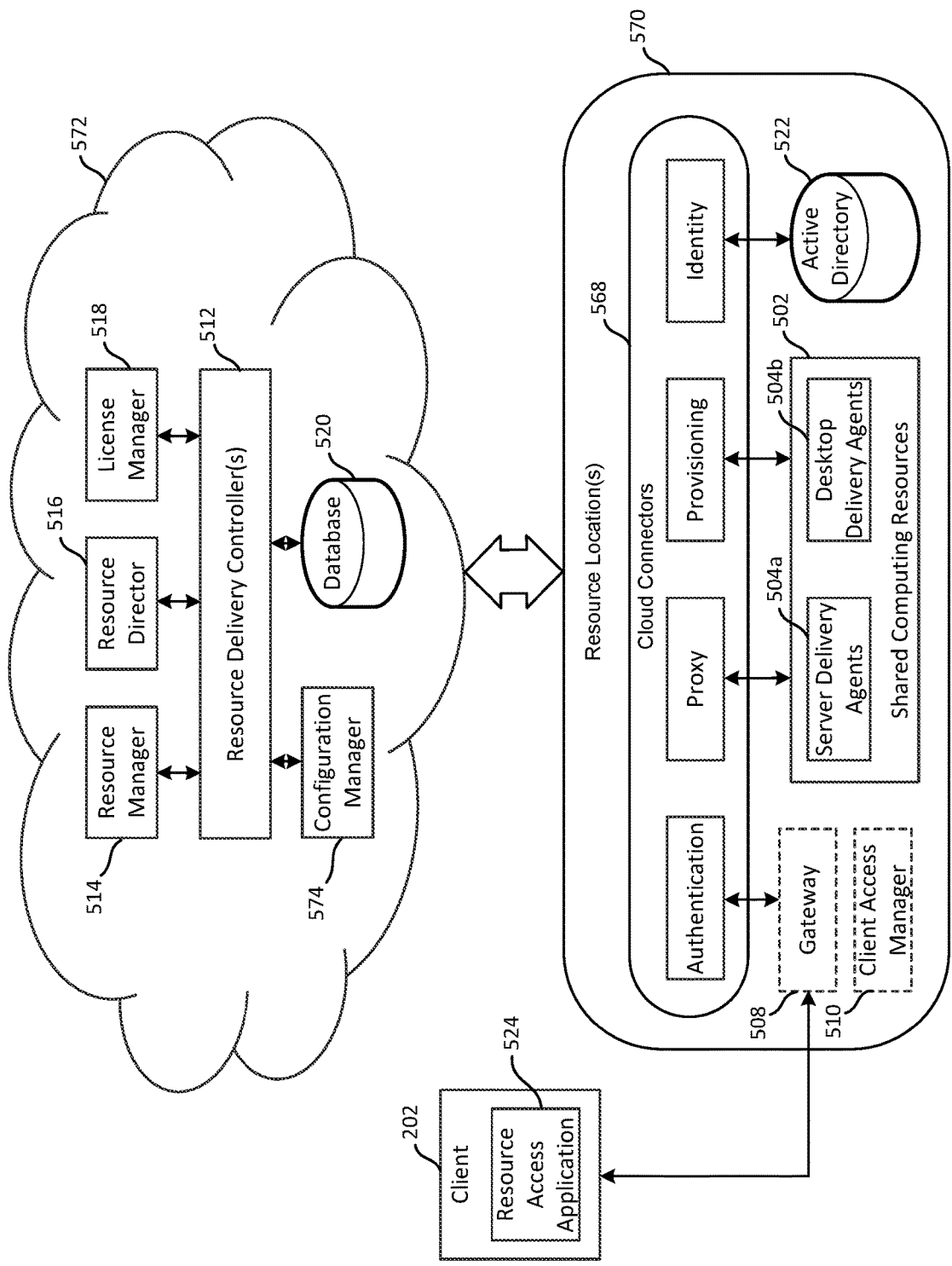
FIG. 5F is a block diagram of a resource delivery system similar to the shown in FIG. 5A but in which several elements are provided as a service within a cloud-based computing environment.

In some implementations, one or more components of the resource delivery system 500 may be provided as a service within a cloud-based computing environment. FIG. 5F illustrates an example of such an implementation. As shown in FIG. 5F, one or more cloud connectors 568 may enable various resources at one or more locations 570 outside of a cloud computing environment 572 to interface with various components within the cloud computing environment 572. As illustrated, resource location(s) 570 may include the machines and other resources that deliver applications and/or desktops to client devices 202. As indicated by dashed lines, the resource location 570 may optionally include the gateway 508 and/or the client access manager 510 previously described. In the illustrated example, the resource delivery controller(s) 512, the resource manager 514, the resource director 516, the license manager 518, and the database(s) 520 are all provided within the cloud computing environment 572. Further, as shown in FIG. 5F, a configuration manager 574 may additionally be hosted within the cloud computing environment 572 in some implementations. Examples of management functions that may be performed by the configuration manager 574 are described below. In some implementations, the cloud computing environment 572 may correspond to a public cloud computing infrastructure, such as AZURE CLOUD provided by Microsoft Corporation of Redmond, Washington, or AMAZON WEB SERVICES provided by Amazon.com, Inc., of Seattle, Washington.

In addition to serving as a channel for communication between the cloud computing environment 572 and the resource location(s) 570, the cloud connectors 568 may enable cloud management without requiring any complex networking or infrastructure configuration such as virtual private networks (VPNs) or Internet Protocol Security (IPsec) tunnels.

As noted above, the resource delivery controller(s) 512 may serve as the central control layer component in a deployment. The resource delivery controller(s) 512 may communicate through the cloud connectors 568 in each resource location 570 to distribute applications and/or desktops, authenticate and manage user access, broker connections between users and their virtual desktops and/or applications, optimize use connections, and/or load-balance use connections. In some implementations, the resource delivery controller(s) 512 may additionally track which users are logged on and where, which session resources the users have, and if users need to reconnect to existing applications. The resource delivery controller(s) 512 may further manage the state of desktops, starting and stopping them based on demand and administrative configuration, in some implementations.

The configuration manager 574 in the cloud computing environment 572 may (A) enable administrators to specify which services are to be made available to users via the resource access application, (B) customize the uniform resource locator (URL) that the resource access application 524 is to use to access the available resources, (C) customize the appearance of the user interface provided by the resource access application, such as logos, color, and preferences, (D) specify how users are to authenticate to the system, such as using the Active Directory 522, and/or (E) specify external connectivity for the resource locations 570.

As noted above, a resource location 570 may include at least one cloud connector 568 that serves as the communications channel between the components in the cloud computing environment 572 and the components in the resource location 570. In the resource location 570, the cloud connector(s) may act as a proxy for the resource delivery controller(s) 512 in the cloud computing environment 572.

As noted above, the physical or virtual machines that deliver applications and/or desktops may include resource delivery agents 504a, 504b. The resource delivery agents 504 may register with at least one cloud connector 568. After registration, connections may be brokered from those resources to users. The resource delivery agents 504 may further establish and manage the connection between the machine and the client device 202, and apply policies that are configured for the session. The resource delivery agents 504 may communicate session information to the cloud connector 568 through the broker agent 556 (shown in FIG. 5D) in the resource delivery agent 504. As noted above, in some implementations, such a broker agent 556 may host multiple plugins and collect real-time data.

A host connection may be established that enables communication between components in the cloud computing environment 572 and the resource delivery agents 504 on the shared computing resources 502. Specifications for such host connections may include (A) the address and credentials to access the host, (B) the tool that is to be used to create VMs, (C) the storage method to use, (D) the machines to use for storage, and/or (E) which network the VMs will use.

Figure 6:
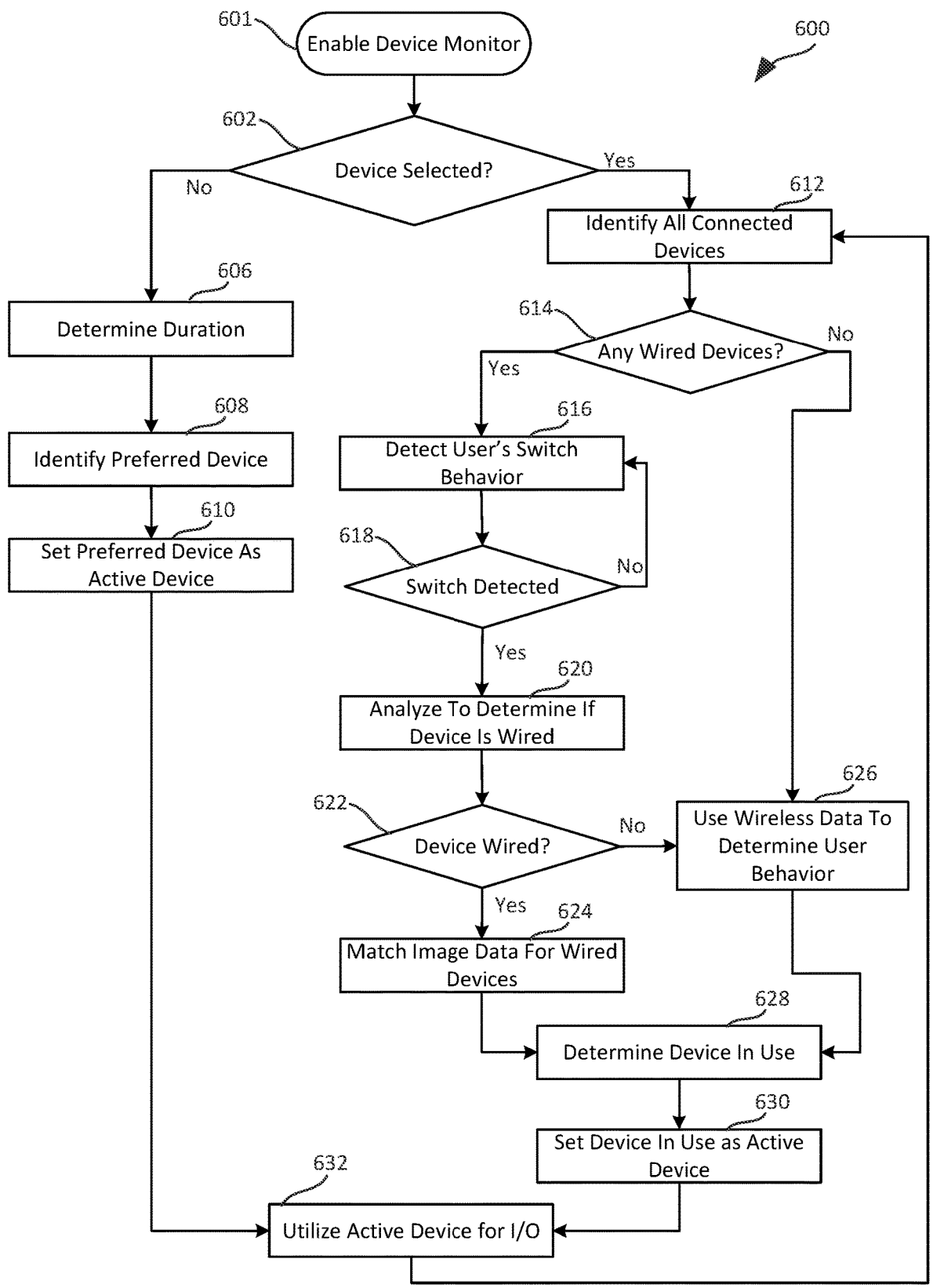
FIG. 6 is flow diagram showing an example routine that may be performed by the device control engine shown in FIG. 1A, in accordance with some embodiments of the present disclosure.

F. Detailed Description of Example Embodiments of the System for Automated Transfer of Peripheral Device Operations Introduced in Section A FIG. 6 is flow diagram showing an example routine 600 that may be performed by the device control engine 104 of the computing system 100 shown in FIG. 1A, in accordance with some embodiments of the present disclosure. The computing system 100 may include at least one processor (e.g., processor(s) 302 shown in FIG. 3) and may include at least one computer-readable medium, which may be encoded with instructions which, when executed by the at least one processor of the computing system 100, may cause the computing system 100 to perform the functionality of the device control engine 104 described herein. As noted in Section A, the computing system 100 may take on any of numerous forms, and the device control engine 104 may be located at any of a number of locations within the computing system 100.

The device control engine 104 may be enabled by the user 102, such as through selecting a user interface element as part of the graphical user interface (GUI) for the computing system 100. For example, instead of the user 102 directly selecting a device as the active device, the user 102 may select a device monitor option 154, as shown in FIGS. 1C and 1D, so as to trigger the device control engine 104 to automatically select the active device. The device control engine 104 may determine the device to select as the active device without further interaction from the user 102. The device control engine 104 may be implemented for multiple types of devices. The routine 600 may thus be performed for respective device types.

Referring to FIG. 6, the routine 600 may begin (at a step 601) when the device control engine 104 is enabled, e.g., in response to the user 102 selecting the device monitor option 154. At a decision step 602, the device control engine 104 may determine whether a device has been selected. When the device control engine 104 determines (at the decision step 602) that a device has not been selected then, per a step 606 of the routine 600, the device control engine 104 may read an effective time duration from a configuration file or database (e.g., the database 112 shown in FIG. 1A) corresponding to the device type. The effective time duration may be a time period, such as the most recent thirty days, used to determine the most frequently used devices within that time period. At a step 608, a preferred device may be identified. A preferred device may be a device from among a plurality of devices of the same type which the user has identified as preferential for use, either by a manual selection or based on historical usage. The preferred device may be determined, for example, based on a setting provided by the user 102. Additionally or alternatively, the preferred device may be determined based on the device used most frequently for the effective time duration. In some implementations, the device control engine 104 may process the user's historical data of the effective time duration for device use using one or more machine learning models. Such historical data may, for example, be stored in the database 112. At a step 610, the determined preferred device may be set as the active device for the computing system 100 which is then utilized at step 632, as an input/output device for the computing system 100.

As noted, in some implementations, a trained machine learning model may be used at the step 608 to identify the preferred device. Device usage data may be collected over time for the user and stored in a database (e.g., the database 112) as information or data (e.g., device usage history) with the effective time duration data. As discussed above in connection with FIG. 5A, in some implementations, the resource delivery system 500 may include one or more monitoring agents (e.g., as a part of the resource access application 524) for performing monitoring, measurement, and data collection activities on a client device 202. Similar monitoring agents may also be employed to monitor activities of a client device 202 when the computing system 100 is embodied in other types of computing environments. In some implementations, such monitoring agent(s) may collect usage data for the connected devices. This usage data may include information such as time of day, location, calendar data, application usage, etc. The collected device usage data may be used to train the machine learning model based on the user's behaviors. For example, a user may commonly listen to music on a speaker at 9:00 PM, and, based on that parameter, among others, the machine learning model may be trained to identify the preferred device as a speaker when the user chooses a music application at night. In another example, a user may typically use a wireless headset for conference calls. Based on usage data indicative of that behavior, the machine learning model may be trained to identify the preferred device as the wireless headset when the user has a conference call scheduled. Accordingly, in some implementations, the device control engine 104 may use the trained machine learning model (at the step 608) to determine the preferred device based on one or more contextual inputs, such as the application that is in use or the time of day.

If, at the decision step 602, the device control engine 104 determines that a device has been selected, then the routine 600 may proceed to a step 612, at which the device control engine 104 may identify the presently connected devices of the pertinent type (e.g., audio input/output devices). As explained in more detail below, in some implementations, the device control engine 104 may select one or more techniques for detecting switches between simultaneously connected devices based on one or more characteristics of the connected devices identified at the step 612. For example, if the device control engine 104 determines (per a decision step 614) that one or more of the connected devices is a wired headset, then the device control engine 104 may employ a camera (e.g., per a step 616) to monitor for use. In another example, if the device control engine 104 determines (per a decision step 622) that one or more Bluetooth® devices are connected, then the device control engine 104 may monitor Bluetooth® signal strength (e.g., per a step 626) to monitor for use.

At the decision step 614, the device control engine 104 may determine if one or more of the identified connected devices is a wired device. If there is at least one connected wired devices, then the device control engine 104 may, at the step 616, monitor the user's behavior to determine if the user has switched devices. For example, in some implementations, a camera may be used to capture images of the user and determine user behavior. For instance, when a headset is connected, the camera may capture images of the user that include wearing a first headset, not wearing a headset, and then wearing a second headset. Images such as these may be provided to a trained machine learning model. Such a machine learning model may be used to quickly identify (e.g., per a decision step 618) when the user switches devices.

In some implementations, the steps 616 and 618 may additionally or alternatively involve monitoring input from connected devices to determine whether a switch between devices has occurred. For example, a microphone of a connected device may begin receiving sounds, such as the user's voice, when the user places the microphone near the user's mouth. The device control engine 104 may take such received input into account when determining whether a user is currently using a given device. New input may be detected, for example, when a user operates a manual switch to begin operating a particular device, or simply when a user begins providing input (e.g., speaking into a microphone) to a different connected device.

Other types of sensors may additionally or alternatively be used to determine when a user has switched devices. For instance, accelerometers and/or gyroscopes in a device may provide data about the movement of a device. For example, movement sensors of a headset may provide data indicating when a user has removed the headset. The device control engine 104 may receive this indication, e.g., at the step 616, and use such indication (e.g., at the decision step 618) to determine that a device switch has occurred. Per the decision step 618, if a switch is not detected, then the device control engine 104 may return to the step 616 and continue to monitor the user's behavior.

If, at the decision step 618, the device control engine 104 detects a device switch, then the routine 600 may proceed to a step 620, at which the device control engine 104 may perform an analysis to determine if the newly-used device is wired. If, at a decision step 622, the device control engine 104 determines that the new device is wired, then the routine 600 may proceed to a step 624, at which the device control engine 104 may, in at least some implementations, perform an image matching operation to identify the new wired device in use. In other implementations, the device control engine 104 may not employ image matching to identify the new wired device, such as if a camera is not present or the device is not within view of the camera. In such implementations, one or more other sensors, such as movement sensors, audio sensors, etc., may be used to identify the new wired device.

As noted, at the step 624, the device control engine 104 may perform image data matching to identify which wired device is in use when multiple wired devices are concurrently connected. For example, headsets may have distinguishing characteristics such shapes, colors, lights, etc. In some implementations, the device control engine 104 may use a trained classifier model to receive captured images of individual devices, such as the headsets, and to identify the particular devices (e.g., particular headset model numbers) that are represented in the respective images. For example, such a machine learning model may be trained to distinguish between various different models of headsets, such as by recognizing characteristics (e.g., shapes, colors, proportions, etc.) that distinguish the different models. The trained machine learning model may additionally or alternatively be trained to recognize general characteristics about the device in use, such as detecting a wire or wires in the captured images and thus determining the device in use is a wired device.

Depending on the type of device, different sensors, or the device itself, may be used to determine which device the user is currently operating. For example, in a circumstance in which the connected devices include multiple cameras, the device control engine 104 may determine, based on inputs received from the cameras, which camera is most likely to be the one the user expects to be in use. Such a determination may, for example, utilize one or more trained machine learning models to evaluate image data and identify images in which the user is present and/or to compare multiple images and determine which image includes the best representation of the front of the user's face. For example, in some implementations, the device control engine 104 may determine the camera in use by the user by determining which camera detects a person, or perhaps even which camera detects a specific person, e.g., the user 102. In another example, the device control engine 104 may determine the camera in use by the user by identifying, based on received image data, the camera at which the user is looking the most directly.

In some implementations, other device sensors may additionally or alternatively be used to determine the device in use when multiple devices are connected. For instance, in some implementations, one or more motion sensors such as accelerometers and/or gyroscopes may be used to detect when a user interacts with a device. For example, a headset may include motion sensors for detecting when a user puts on or takes off the headset. This motion sensor data may be used by the device control engine 104 to determine which device the user 102 has started using and which device the user 102 has stopped using.

If, at the decision step 614, the device control engine 104 determines that there are no wired devices, or if, at the decision step 622, the device control engine 104 determines the new device is not wired, then the routine 600 may proceed to a step 626, at which the device control engine 104 may use wireless data from the devices to determine user behavior. For example, if one or more of the wireless devices are connected to the computing system 100 by Bluetooth®, then a distance calculation may be used to determine the user behavior, or the switch, and identify the new wireless device in use by the user. Although not illustrated in FIG. 6, in some implementations, prior to proceeding to the step 626, the device control engine 104 may perform one or more of the operations described above in connection with the steps 616 and 618 after determining there are no wired devices at the step 614.

With respect to the step 626, in some implementations, the device control engine 104 may use the measured power of the Bluetooth signal to perform a calculation to determine a distance of the one or more devices from the computing system 100. The following formula of Equation 1 may be used to determine the Distance of a Bluetooth enabled device from the computing system 100 based on the Bluetooth signal. The device may provide a Received Signal Strength Indicator (RSSI) that is the strength of the signal from the computing system 100 as received by the device. In Equation 1, Measured Power is a factory calibrated constant for the particular device that indicates the expected RSSI at a distance of 1 meter and n is another constant that may be adjusted based on environmental factors.

$$\text{Distance} = 10 \frac{(\text{Measured Power} - RSSI)}{10 * n} \quad \text{Equation (1)}$$

Accordingly, in some implementations, a variance of the distance may instead be used to determine the device in use. For example, when two Bluetooth devices of the same type are concurrently connected to the computing system, the user is most likely utilizing one device at a time. The distance of the in use device from a client device 202 may be changing, even if slightly such as with a headset and the movements of the user's head, whereas a device not in use is not moving and will report very little or no variance of distance. Thus, the device in use may be identified based on which device has a greater variance of distance.

To determine this distance variance, the device control engine 104 may determine how far a set of numbers is spread out from their average value for individual devices and choose the device with the larger variance. A first formula of Equation 2 may be used to determine the difference X of the distance value for a time interval, such as every 10 milliseconds, where $\text{Distance}_{i+1}$ and $\text{Distance}_i$ are two calculated distance values for consecutive time interval.

$$X = \text{Distance}_{i+1} - \text{Distance}_i \quad \text{Equation (2)}$$

The average change in distance Mean(x) may then be calculated with a second formula of Equation 3, where n is the size of the set of difference calculations for a time period $$\text{Mean}(x) = \frac{\sum_{i=1}^{n} x_i}{n} \quad \text{Equation (3)}$$

Using the average change in distance, the Variance (x) for a device may then be calculated with a third formula of Equation 4.

$$\text{Variance}(x) = \frac{\sum_{i=1}^{n} (X_i - \text{Mean}(x))^2}{n - 1} \quad \text{Equation (4)}$$

Finally, with a fourth formula of Equation 5, the maximum variance value Result(x) may be determined and compared with the maximum variance value for individual devices to identify the device in use.

$$\text{Result}(x) = \text{Max} \sum_{i=1}^{n} (\text{Variance}(x_i)) \qquad \text{Equation (5)}$$

At a step 628 of the routine 600, the device control engine 104 may use the determinations from the step 624 and/or the step 626 to determine the device in use. In some implementations, if the device control engine 104 was unable to determine a device in use pursuant to the step 624 or the step 626, the device control engine 104 may perform the steps 606 and 608 to determine a preferred device as a default.

At a step 630 of the routine 600, the device control engine 104 may set the device in use as the active device for computing system 100 and/or the application 106. This may include updating a graphical user interface element to display the name of the active device, such as shown in FIG. 1D. In some implementations, a graphical user interface element, such as a notification, may be displayed to notify the user of the change of active device. In some implementations the notification may prompt the user to confirm the active device switch. The user experience is improved as the device control engine 104 automatically identifies the switch between devices. Instead of requiring the user 102 to both physically switch devices and provide a device change indication to the computing system 100 or application 106, the device control engine 104 may automatically identify the device switch and transfer operations to the active device. The user may be acquainted with the procedures for switching frequently used devices on the computing system 100. However, the user may be less familiar with infrequently used devices which in some instances may result in more missed interactions as the user attempts to indicate the device switch. Utilizing the device control engine 104, the user experience may be improved, regardless of the user's familiarity with the procedures for indicating a device switch with the computing system 100 or application 106.

In some implementations, in connection with the step 630, the time of use for the previous, or switched from, device may be recorded in the database 112, such as for determining the effective time duration in step 606 and step 608. At a step 632, the device control engine 104 may cause the computing system 100 and/or the application 106 to utilize the active device for data input and/or output. In some implementations, this may cause the computing system 100 and/or the application 106 to receive input, such as audio data from a microphone or image data from a camera, from the identified active device instead of the previous, or switched from, device. In some implementations, the computing system 100 and/or the application 106 may provide output to the identified active device instead of the previous, or switched from, device. From the step 632, the routine 600 may return to the step 612, at which the device control engine 104 may identify the presently connected devices and continue to monitor for a device switch.

As noted above in Section A, in some implementations, FIGS. 1A and 1B may include a client device 202 to which virtualized applications and/or desktops may be delivered via a resource delivery agent 504 of a shared computing resource 502, e.g., as described in Section D. In some such implementations, the device control engine 104 may be included, at least in part, within the resource access application 524 (depicted in FIGS. 5A-D) associated with a client device 202 to which multiple peripheral devices of a similar type are connected (e.g., simultaneously connected), and the application 106 with which an active device (selected from amongst those simultaneously connected peripheral devices) communicates may be hosted on a shared computing resource 502 (also depicted in FIGS. 5A-D). As such, as described in more detail below, in some such implementations, the device control engine 104 may perform the routine 600 to determine the active device of the client device 202 that is to interact with the remotely hosted application 106 via one or more virtual channels established between the resource access application 524 and the resource delivery agent 504.

The resource delivery agent 504 of a shared computing resource 502, such as described in Section D, may receive resource data of the client device 202, such as devices connected to the client device 202. The resource access application 524 of the client device 202 and resource delivery agent 504 may communicate via TCP.

In some implementations, the device control engine 104, as part of the resource access application 524, may identify the new active device to the resource delivery agent 504 when a device switch occurs at the client device 202, thus enabling the resource delivery agent 504 to receive and send data to the newly-used device, on the same virtual channel as the previous device. For example, a virtual audio channel may be established for a first headset connected to the client device 202 to communicate data with the resource delivery agent 504. When the device control engine 104 determines the user has switched to a second headset, the device control engine 104 may communicate data indicating the second headset as the device in use to the resource delivery agent 504. The resource delivery agent 504 may then identify the second headset as the active device and continue to communicate on the same virtual audio channel.

G. Example Implementations of Methods, Systems, and Computer-Readable Media in Accordance with the Present Disclosure The following paragraphs (M1) through (M12) describe examples of methods that may be implemented in accordance with the present disclosure.

(M1) A method may be performed that involves while both a first device of a first type and a second device of the first type are simultaneously connected to a client device, using the first device, rather than the second device, as an active device of the first type for at least one application, the first device and the second device being peripheral devices; while both the first device and the second device remain connected to the client device, determining a switch from the first device to the second device by a user; and based at least in part on the switch from the first device to the second device, using the second device, rather than the first device, as the active device of the first type for the at least one application.

(M2) A method may be performed as described in paragraph (M1), and may further involve the at least one application being executed by a remote server and delivered to the client device as a virtual application.

(M3) A method may be performed as described in paragraph (M1) or paragraph (M2), wherein determining the switch from the first device to the second device may further involve receiving data from at least one sensor; and determining, based at least in part on the data, that the user has stopped use of the first device and begun use of the second device.

(M4) A method may be performed as described in any of paragraphs (M1) through (M3), wherein the first device and second device may have different connection types, and determining the switch from the first device to the second device may further involve receiving first data from a first sensor monitoring a first characteristic of the first device; receiving second data from a second sensor monitoring a second characteristic of the second device; and determining, based at least in part on the first data and the second data, that the user has stopped use of the first device and begun use of the second device.

(M5) A method may be performed as described in any of paragraphs (M1) through (M4), and may further involve receiving first wireless signal data and second wireless signal data from the first device; and wherein determining the switch from the first device to the second device may be based at least in part on the first wireless signal data and the second wireless signal data.

(M6) A method may be performed as described in paragraph (M5), wherein determining the switch from the first device to the second device may further involve determining at least a first distance value based on the first wireless signal data; determining at least a second distance value based on the second wireless signal data; and wherein determining the switch from the first device to the second device may be further based at least in part on the first distance value and the second distance value.

(M7) A method may be performed as described in any of paragraphs (M1) through (M6), wherein determining the switch from the first device to the second device may further involve receiving first wireless signal data from the first device; determining a first distance variance for the first device based at least in part on the first wireless signal data; receiving second wireless signal data from the second device; determining a second distance variance for the second device based at least in part on the first wireless signal data; and determining the second distance variance is greater than the first distance variance.

(M8) A method may be performed as described in any of paragraphs (M1) through (M7), and may further involve receiving at least a first image captured by the client device; wherein determining the switch from the first device to the second device may be based at least in part on the first image.

(M9) A method may be performed as described in paragraph (M8), wherein determining the switch from the first device to the second device may further involve determining that the second device may be represented in the first image.

(M10) A method may be performed as described in paragraph (M9), and may further involve receiving a second image captured by the client device prior to capturing the first image; wherein determining the switch from the first device to the second device may be further based at least in part on the second image.

(M11) A method may be performed as described in paragraph (M10), wherein determining the switch from the first device to the second device may further involve determining that the first device may be represented in the second image.

(M12) A method may be performed as described in any of paragraphs (M1) through (M11), and may further involve selecting the first device as the active device of the first type for the at least one application based at least in part on at least one of a preference of a user or a history of usage of devices of the first type.

The following paragraphs (S1) through (S12) describe examples of systems and devices that may be implemented in accordance with the present disclosure.

(S1) A system may comprise at least one processor, and at least one computer-readable medium encoded with instructions which, when executed by the at least one processor, cause the system, while both a first device of a first type and a second device of the first type are simultaneously connected to a client device, to use the first device, rather than the second device, as an active device of the first type for at least one application, the first device and the second device being peripheral devices; while both the first device and the second device remain connected to the client device, to determine a switch from the first device to the second device by a user; and based at least in part on the switch from the first device to the second device, to use the second device, rather than the first device, as the active device of the first type for the at least one application.

(S2) A system may be configured as described in paragraph (S1), wherein the at least one application may be executed by a remote server and delivered to the client device as a virtual application.

(S3) A system may be configured as described in paragraph (S1) or paragraph (S2), wherein the at least one computer-readable medium may be further encoded with additional instructions which, when executed by the at least one processor, further cause the system to determine the switch from the first device to the second device at least in part by receiving data from at least one sensor; and determining, based at least in part on the data, that the user has stopped use of the first device and begun use of the second device.

(S4) A system may be configured as described in any of paragraphs (S1) through (S3), wherein the first device and second device may have different connection types, and the at least one computer-readable medium may be further encoded with additional instructions which, when executed by the at least one processor, further cause the system to determine the switch from the first device to the second device at least in part by receiving first data from a first sensor monitoring a first characteristic of the first device; receiving second data from a second sensor monitoring a second characteristic of the second device; and determining, based at least in part on the first data and the second data, that the user has stopped use of the first device and begun use of the second device.

(S5) A system may be configured as described in any of paragraphs (S1) through (S4), wherein the at least one computer-readable medium may be further encoded with additional instructions which, when executed by the at least one processor, further cause the system to receive first wireless signal data and second wireless signal data from the first device, and to determine the switch from the first device to the second device based at least in part on the first wireless signal data and the second wireless signal data.

(S6) A system may be configured as described in paragraph (S5), wherein the at least one computer-readable medium may be further encoded with additional instructions which, when executed by the at least one processor, further cause the system to determine the switch from the first device to the second device at least in part by determining at least a first distance value based on the first wireless signal data; determining at least a second distance value based on the second wireless signal data; and determining the switch from the first device to the second device further based at least in part on the first distance value and the second distance value.

(S7) A system may be configured as described in any of paragraphs (S1) through (S6), wherein the at least one computer-readable medium may be further encoded with additional instructions which, when executed by the at least one processor, further cause the system to determine the switch from the first device to the second device at least in part by receiving first wireless signal data from the first device; determining a first distance variance for the first device based at least in part on the first wireless signal data; receiving second wireless signal data from the second device; determining a second distance variance for the second device based at least in part on the first wireless signal data; and determining the second distance variance is greater than the first distance variance.

(S8) A system may be configured as described in any of paragraphs (S1) through (S7), wherein the at least one computer-readable medium may be further encoded with additional instructions which, when executed by the at least one processor, further cause the system to receive at least a first image captured by the client device; and to determine the switch from the first device to the second device based at least in part on the first image.

(S9) A system may be configured as described in paragraph (S8), wherein the at least one computer-readable medium may be further encoded with additional instructions which, when executed by the at least one processor, further cause the system to determine the switch from the first device to the second device at least in part by determining that the second device may be represented in the first image.

(S10) A system may be configured as described in paragraph (S9), wherein the at least one computer-readable medium may be further encoded with additional instructions which, when executed by the at least one processor, further cause the system to receive a second image captured by the client device prior to capturing the first image; and to determine the switch from the first device to the second device further based at least in part on the second image.

(S11) A system may be configured as described in paragraph (S10), wherein the at least one computer-readable medium may be further encoded with additional instructions which, when executed by the at least one processor, further cause the system to determine the switch from the first device to the second device at least in part by determining that the first device may be represented in the second image.

(S12) A system may be configured as described in any of paragraphs (S1) through (S11), wherein the at least one computer-readable medium may be further encoded with additional instructions which, when executed by the at least one processor, further cause the system to select the first device as the active device of the first type for the at least one application based at least in part on at least one of a preference of a user or a history of usage of devices of the first type.

The following paragraphs (CRM1) through (CRM12) describe examples of computer-readable media that may be implemented in accordance with the present disclosure.

(CRM1) At least one non-transitory computer-readable medium may be encoded with instructions which, when executed by the at least one processor of a system, cause the system, while both a first device of a first type and a second device of the first type are simultaneously connected to a client device, to use the first device, rather than the second device, as an active device of the first type for at least one application, the first device and the second device being peripheral devices; while both the first device and the second device remain connected to the client device, to determine a switch from the first device to the second device by a user; and based at least in part on the switch from the first device to the second device, to use the second device, rather than the first device, as the active device of the first type for the at least one application.

(CRM2) At least one non-transitory computer-readable medium may be configured as described in paragraph (CRM1), wherein the at least one application may be executed by a remote server and delivered to the client device as a virtual application.

(CRM3) At least one non-transitory computer-readable medium may be configured as described in paragraph (CRM1) or paragraph (CRM2), and may be further encoded with additional instructions which, when executed by the at least one processor, further cause the system to determine the switch from the first device to the second device at least in part by receiving data from at least one sensor; and determining, based at least in part on the data, that the user has stopped use of the first device and begun use of the second device.

(CRM4) At least one non-transitory computer-readable medium may be configured as described in any of paragraphs (CRM1) through (CRM3), wherein the first device and second device may have different connection types, and the at least one computer-readable medium may be further encoded with additional instructions which, when executed by the at least one processor, further cause the system to determine the switch from the first device to the second device at least in part by receiving first data from a first sensor monitoring a first characteristic of the first device; receiving second data from a second sensor monitoring a second characteristic of the second device; and determining, based at least in part on the first data and the second data, that the user has stopped use of the first device and begun use of the second device.

(CRM5) At least one non-transitory computer-readable medium may be configured as described in any of paragraphs (CRM1) through (CRM4), and may be further encoded with additional instructions which, when executed by the at least one processor, further cause the system to receive first wireless signal data and second wireless signal data from the first device, and to determine the switch from the first device to the second device based at least in part on the first wireless signal data and the second wireless signal data.

(CRM6) At least one non-transitory computer-readable medium may be configured as described in paragraph (CRM5), and may be further encoded with additional instructions which, when executed by the at least one processor, further cause the system to determine the switch from the first device to the second device at least in part by determining at least a first distance value based on the first wireless signal data; determining at least a second distance value based on the second wireless signal data; and determining the switch from the first device to the second device further based at least in part on the first distance value and the second distance value.

(CRM7) At least one non-transitory computer-readable medium may be configured as described in any of paragraphs (CRM1) through (CRM6), and may be further encoded with additional instructions which, when executed by the at least one processor, further cause the system to determine the switch from the first device to the second device at least in part by receiving first wireless signal data from the first device; determining a first distance variance for the first device based at least in part on the first wireless signal data; receiving second wireless signal data from the second device; determining a second distance variance for the second device based at least in part on the first wireless signal data; and determining the second distance variance is greater than the first distance variance.

(CRM8) At least one non-transitory computer-readable medium may be configured as described in any of paragraphs (CRM1) through (CRM7), and may be further encoded with additional instructions which, when executed by the at least one processor, further cause the system to receive at least a first image captured by the client device; and to determine the switch from the first device to the second device based at least in part on the first image.

(CRM9) At least one non-transitory computer-readable medium may be configured as described in paragraph (CRM8), and may be further encoded with additional instructions which, when executed by the at least one processor, further cause the system to determine the switch from the first device to the second device at least in part by determining that the second device may be represented in the first image.

(CRM10) At least one non-transitory computer-readable medium may be configured as described in paragraph (CRM9), and may be further encoded with additional instructions which, when executed by the at least one processor, further cause the system to receive a second image captured by the client device prior to capturing the first image; and to determine the switch from the first device to the second device further based at least in part on the second image.

(CRM11) At least one non-transitory computer-readable medium may be configured as described in paragraph (CRM10), and may be further encoded with additional instructions which, when executed by the at least one processor, further cause the system to determine the switch from the first device to the second device at least in part by determining that the first device may be represented in the second image.

(CRM12) At least one non-transitory computer-readable medium may be configured as described in any of paragraphs (CRM1) through (CRM11), and may be further encoded with additional instructions which, when executed by the at least one processor, further cause the system to select the first device as the active device of the first type for the at least one application based at least in part on at least one of a preference of a user or a history of usage of devices of the first type.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   while both a first device of a first type and a second device of the first type are simultaneously connected to a client device, using the first device, rather than the second device, as an active device of the first type for at least one application, the first device and the second device being peripheral devices;
   while both the first device and the second device remain connected to the client device, determining a switch from the first device to the second device by a user;
   based at least in part on the switch from the first device to the second device, using the second device, rather than the first device, as the active device of the first type for the at least one application; and
   receiving at least a first image captured by the client device;
   wherein determining the switch from the first device to the second device is based at least in part on the first image.

2. The method of claim 1, wherein the at least one application is executed by a remote server and delivered to the client device as a virtual application.

3. The method of claim 1, wherein determining the switch from the first device to the second device further comprises:
   receiving data from at least one sensor; and
   determining, based at least in part on the data, that the user has stopped use of the first device and begun use of the second device.

4. The method of claim 1, wherein the first device and second device have different connection types, and determining the switch from the first device to the second device further comprises:
   receiving first data from a first sensor monitoring a first characteristic of the first device;
   receiving second data from a second sensor monitoring a second characteristic of the second device; and
   determining, based at least in part on the first data and the second data, that the user has stopped use of the first device and begun use of the second device.

5. The method of claim 1, further comprising:
   receiving first wireless signal data and second wireless signal data from the first device; and
   wherein determining the switch from the first device to the second device is based at least in part on the first wireless signal data and the second wireless signal data.

6. The method of claim 1, wherein determining the switch from the first device to the second device further comprises:
   receiving first wireless signal data from the first device;
   determining a first distance variance for the first device based at least in part on the first wireless signal data;
   receiving second wireless signal data from the second device;
   determining a second distance variance for the second device based at least in part on the first wireless signal data; and determining the second distance variance is greater than the first distance variance.

7. The method of claim 1, wherein determining the switch from the first device to the second device further comprises: determining that the second device is represented in the first image.

8. The method of claim 1, further comprising: selecting the first device as the active device of the first type for the at least one application based at least in part on at least one of a preference of a user or a history of usage of devices of the first type.

9. The method of claim 5, wherein determining the switch from the first device to the second device further comprises:
determining at least a first distance value based on the first wireless signal data;
determining at least a second distance value based on the second wireless signal data; and
wherein determining the switch from the first device to the second device is further based at least in part on the first distance value and the second distance value.

10. The method of claim 7, further comprising:
receiving a second image captured by the client device prior to capturing the first image;
wherein determining the switch from the first device to the second device is further based at least in part on the second image.

11. The method of claim 10, wherein determining the switch from the first device to the second device further comprises:
determining that the first device is represented in the second image.

12. A system, comprising:
at least one processor; and
at least one computer-readable medium encoded with instructions which, when executed by the at least one processor, cause the system to:
while both a first device of a first type and a second device of the first type are simultaneously connected to a client device, use the first device, rather than the second device, as an active device of the first type for at least one application, the first device and the second device being peripheral devices,
while both the first device and the second device remain connected to the client device, determine a switch from the first device to the second device by a user,
based at least in part on the switch from the first device to the second device, use the second device, rather than the first device, as the active device of the first type for the at least one application; and
receive at least a first image captured by the client device;
wherein determining the switch from the first device to the second device is based at least in part on the first image.

13. The system of claim 12, wherein determining the switch from the first device to the second device, the at least one computer-readable medium is further encoded with additional instructions which, when executed by the at least one processor, further cause the system to:
receive data from at least one sensor; and
determine, based at least in part on the data, that the user has stopped use of the first device and begun use of the second device.

14. The system of claim 12, wherein the first device and second device have different connection types, and determining the switch from the first device to the second device, the at least one computer-readable medium is further encoded with additional instructions which, when executed by the at least one processor, further cause the system to:
receive first data from a first sensor monitoring a first characteristic of the first device;
receive second data from a second sensor monitoring a second characteristic of the second device; and
determine, based at least in part on the first data and the second data, that the user has stopped use of the first device and begun use of the second device.

15. The system of claim 12, wherein the at least one computer-readable medium is further encoded with additional instructions which, when executed by the at least one processor, further cause the system to:
receive first wireless signal data and second wireless signal data from the first device; and
wherein determining the switch from the first device to the second device is based at least in part on the first wireless signal data and the second wireless signal data.

16. The system of claim 12, wherein determining the switch from the first device to the second device, the at least one computer-readable medium is further encoded with additional instructions which, when executed by the at least one processor, further cause the system to:
receive first wireless signal data from the first device;
determine a first distance variance for the first device based at least in part on the first wireless signal data;
receive second wireless signal data from the second device;
determine a second distance variance for the second device based at least in part on the first wireless signal data; and
determine the second distance variance is greater than the first distance variance.

17. The system of claim 15, wherein determining the switch from the first device to the second device, the at least one computer-readable medium is further encoded with additional instructions which, when executed by the at least one processor, further cause the system to:
determine at least a first distance value based on the first wireless signal data;
determine at least a second distance value based on the second wireless signal data; and
wherein determining the switch from the first device to the second device is further based at least in part on the first distance value and the second distance value.

18. At least one non-transitory computer-readable medium encoded with instructions which, when executed by at least one processor of a system, cause the system to:
while both a first device of a first type and a second device of the first type are simultaneously connected to a client device, use the first device, rather than the second device, as an active device of the first type for at least one application, the first device and the second device being peripheral devices;
while both the first device and the second device remain connected to the client device, determine a switch from the first device to the second device by a user;
based at least in part on the switch from the first device to the second device, use the second device, rather than the first device, as the active device of the first type for the at least one application; and
receive at least a first image captured by the client device;
wherein determining the switch from the first device to the second device is based at least in part on the first image.

* * * * *